United States Patent
Goldstein et al.

(10) Patent No.: US 7,216,290 B2
(45) Date of Patent: May 8, 2007

(54) SYSTEM, METHOD AND APPARATUS FOR SELECTING, DISPLAYING, MANAGING, TRACKING AND TRANSFERRING ACCESS TO CONTENT OF WEB PAGES AND OTHER SOURCES

(75) Inventors: Eric Goldstein, New York, NY (US); Ralph E. Machesky, Londonderry, NH (US); Matthew Babineau, Manchester, NH (US); Derek Krzanowski, Pinellas Park, FL (US); Henri Thuma, Clearwater, FL (US)

(73) Assignee: Amplify, LLC, New York, NY (US)

( * ) Notice: Subject to any disclaimer, the term of this patent is extended or adjusted under 35 U.S.C. 154(b) by 373 days.

(21) Appl. No.: 10/254,440

(22) Filed: Sep. 25, 2002

(65) Prior Publication Data
US 2003/0221167 A1    Nov. 27, 2003

Related U.S. Application Data

(63) Continuation-in-part of application No. PCT/US02/14059, filed on Apr. 25, 2002.

(60) Provisional application No. 60/286,417, filed on Apr. 25, 2001.

(51) Int. Cl.
*G06F 17/00* (2006.01)

(52) U.S. Cl. .................................. 715/501.1; 715/530

(58) Field of Classification Search ............... 715/530, 715/501.1
See application file for complete search history.

(56) References Cited

U.S. PATENT DOCUMENTS

| 5,734,380 A | 3/1998 | Adams et al. |
| 5,751,283 A | 5/1998 | Smith |
| 5,754,175 A | 5/1998 | Koppolu et al. |
| 5,838,906 A | 11/1998 | Doyle et al. |
| 5,877,765 A | 3/1999 | Dickman et al. |
| 5,897,644 A | 4/1999 | Nielsen |

(Continued)

OTHER PUBLICATIONS

Capturing Images in Netscape Communicator, http://www.internet4classrooms.com/netscape_images.htm, Apr. 15, 2001, pp. 1-3.

(Continued)

*Primary Examiner*—William Bashore
*Assistant Examiner*—L. Ries
(74) *Attorney, Agent, or Firm*—Schweitzer Cornman Gross & Bondell LLP

(57) ABSTRACT

A method, system and apparatus for selecting, displaying, managing, tracking and transferring access to content of Internet web pages and other sources has programming permitting a user to create custom selections of selected image, animation, movie and text content items, and other types of content items from web pages or other sources from the same or different network sources containing multiple content items in an independent, resizable, rescalable browser window; permitting the user to transfer access to the custom selection of content items to a recipient; permitting the user or recipient to navigate quickly to a source of a content item in the custom selection; and permitting the user to define search keywords for performing searches related to content items in a custom selection; and other features. A method of tracking viewing and sharing activities of content items and custom selections of content items by users and recipients is also disclosed.

19 Claims, 23 Drawing Sheets

U.S. PATENT DOCUMENTS

| | | | |
|---|---|---|---|
| 6,008,809 | A | 12/1999 | Brooks |
| 6,023,275 | A | 2/2000 | Horvitz et al. |
| 6,037,934 | A | 3/2000 | Himmel et al. |
| 6,052,130 | A | 4/2000 | Bardon et al. |
| 6,185,589 | B1 | 2/2001 | Votipka |
| 6,215,502 | B1 | 4/2001 | Ferguson |
| 6,216,141 | B1 | 4/2001 | Straub et al. |
| 6,272,493 | B1 | 8/2001 | Pasquali |
| 6,278,448 | B1 | 8/2001 | Brown et al. |
| 6,396,500 | B1 | 5/2002 | Qureshi et al. |
| 6,405,221 | B1 | 6/2002 | Levine et al. |
| 6,605,120 | B1 | 8/2003 | Fields et al. |
| 6,944,821 | B1 * | 9/2005 | Bates et al. ............... 715/530 |

OTHER PUBLICATIONS

Composing and editing Webpages—An overview of Composer and its features, http://wp.netscape.com/eng/mozilla/4.0/handbook/comp.htm, Aug. 9, 2000, pp. 3-6 and 24-27.

Netscape Help—My Netscape, May 2, 2001, http://help.netscape.com/mynetscape/faq.html, pp. 1-6.

Using an Octopus to Drive Non-Members to Your Reviews; Pricetool.com, Nov. 28, '00.

NAR's Web Intelligence Summary—No. 11; Realtor.org, Jul. 2000.

Better Ways to Browse the Web; Harry McCracken, PCWorld.com, Oct. 27, 2000.

Octopus Revamps Web Customization Service; Tom Spring, PCWorld.com, Jul. 7, 2000.

Octopus.com Partners With Content Providers; Writenews.com, Aug. 9, 2000.

Octopus CEO Steve Douty. (Company Business and Marketing); Kathryn O'Brien, Internet World, Apr. 1, 2001.

Content Goes to Pieces. (Company Business and Marketing); James C. Luh, Internet World, Jul. 1, 2000.

* cited by examiner

SYSTEM, METHOD AND APPARATUS FOR SELECTING, DISPLAYING, MANAGING, TRACKING AND TRANSFERRING ACCESS TO CONTENT OF WEB PAGES AND OTHER SOURCES

RELATED APPLICATIONS

This application is a continuation-in-part of international application serial number PCT/US02/14059, filed Apr. 25, 2002, unpublished (as of the filing date of this application), which claims the benefit of U.S. provisional application Ser. No. 60/286,417, filed Apr. 25, 2001.

FIELD OF THE INVENTION

The invention pertains in general to the World Wide Web, and more particularly to a method, system and apparatus for selecting, displaying, managing, tracking and transferring access to content accessible by computing devices on the World Wide Web and other sources.

BACKGROUND OF THE INVENTION

Interconnected computer systems, such as those interconnected by the Internet, and the like, provide fast and convenient means for obtaining information from various sources throughout the world, and for sharing the information with others. In the world of the Internet, one of the forms of this information is the web page.

An Internet web page can contain a large amount of information and a large number of individual items, such as text, photographs, moving images and the like. The present invention enables Users to quickly and conveniently focus on and display separately selected items of content of a web page, and to share those selected items with other individuals or systems over the network.

The World Wide Web uses a growing variety of media, styles and elements arranged in the form of web pages. These web pages contain various types of content, including text, pictures and other compelling visual formats. As a rule, web pages have a finite amount of usable space in which to place text, images, and other content. Because of this, the authors of the web pages must make compromises in regards to how much space is reserved for textual information, and how much for the other visual aspects (images, animation, video, etc). An analogy can be made to a newspaper. Each section of the paper is provided its own 'space' on the paper itself, with boundaries defining where topics, stories and pictures appear. Since a web page also follows many of these same layout restrictions, elements within a web page are typically restricted to given areas on the page.

One notable difference between the pages of printed matter and the pages of a web site lies in the digital format of the web page. The web page can be dynamic and changeable, whereas the printed pages are fixed and unchanging. But because web pages share much of their layout characteristics with the printed page, even the digital format must obey the space restrictions placed upon it. This is what determines how much space a picture or image gets, in comparison to the text on a page. Text, be it on a printed page or web page, follows normal publishing rules regarding size, font, spacing and other factors affecting the page design. Images, pictures and other rich content, however, are restricted by the remaining limited space available on the page. There is, therefore, a need for a method, system and apparatus that allows users to display selected content from web pages and other sources in separate, scalable, and re-sizeable windows.

Often, as users view web pages, they find that they have no easy or practical way to simultaneously view content from two different web pages or web sites. Some of the methods that have been devised to overcome this limitation include launching multiple instances of a web browser, or opening a link in a new window (both launch a new full instance of the browser). This allows users to try to resize the content within each page or browser instance, and fit both on the screen together. Most browsers will resize, but the contents within the page often will not. Additionally, by opening another fully enabled browser instance, users consume more memory resources than one browser instance would consume. By opening a link in a new window (if permitted), users are still running another full browser instance, and downloading that whole page in its entirety, regardless of which part of the page interests them, wasting time and bandwidth. Most web browsers (and web sites) display one web page at a time. To display more than one page, additional browser instances would be opened. There is, therefore, a need for a method, system and apparatus that allows users to simultaneously display selected content from different web pages in a manner that does not require the user to launch multiple fully-enabled browsers.

If a user wants to share web page content with others, the current and easiest existing method is to E-mail a 'link' to that content. The user would simply copy the URL in the address bar of their browser and paste it into an E-mail message. Another method that is considerably faster is that of Instant Messaging. Online, the user would copy and paste the URL of the shared web page in real-time. This has significant speed advantages, and allows for an almost 'virtual meeting' to take place. Unfortunately, the web pages do not always indicate the URL for the web page a user is viewing. This makes it difficult, if not impossible for the user to 'share' the location of this web page with another user. Another problem is caused by dynamic, form driven pages. These pages may have a number of drop-down lists from which the user could choose, or blank fields that might require user input. Because the URL for the resulting page may not be visible to the end user, it is difficult for a user show another user selected content. Much time is wasted by users having to 'walk' the other user through the entire web site in order for them to see the same results on their browser. There is, therefore, a need for a method and system that allows users to 'share' selected visual content from web pages with other users. There is also, therefore, a need for a method, system and apparatus that allows users to share only selected content from web pages in a manner that saves time and reduces bandwidth use.

The current invention also relates to the 'tracking' of online activity of web users. Existing methods of tracking online activity often involve the use of a 'cookie', which is a small file written to, and then subsequently read from a user's computer. Advertising companies that serve up 'banner ads' are predominant users of these cookie files. As users 'surf' (i.e. view) web pages, 'cookies' are created for the purpose of tracking what pages or web sites the user visits. Companies track, record and sell this information to other companies that are interested in obtaining such data. Many users and privacy advocates are speaking out against the invasive tracking method of using cookies.

While it is true that users can simply choose not to accept a cookie while on a specific web site, much, if not all, of the web site's functionality often becomes inaccessible by doing so. In effect, the web site forces the user to accept the cookies in order to fully use the site. On any given web page, the user can be prompted several times to 'accept' a cookie if their browser settings do not accept them automatically. While the cookie was originally created to allow users to enjoy dynamic content and other rich experiences, today it is mainly a tracking measure. Users have begun to rely on third party software programs to purge their computers of cookie files, only to often have them recreated when they return to the web.

Another tracking method is the 'web bug'. Just as the name implies, web bugs are actually tiny graphics, usually 1 pixel×1 pixel in size. Because of the tiny size of these special graphics, they are extremely hard to notice or even find if you look for them. Much like the cookie file, the web-bugs function is to report back to its server the IP address and other data of a user viewing the web page. Most users have no idea that the web bug is there, let alone what it does. To properly illustrate the hiding power of the web bug, imagine that a microphone is implanted within this very paper you are reading. The size of this microphone is the size of the period at the end of this sentence, and it is painted white to match the paper color perfectly. As newer and more brazen methods of tracking user activity are developed, users continue to develop methods of foiling such data collection efforts.

These tracking and data collection efforts may never end, but they will likely change. Users want privacy, and they expect non-invasive ways for data tracking to be used. Advertisers and content providers, on the other hand, want a tracking solution that provides the most reliable data possible, via a method that cannot be thwarted or spoofed by users. There is, therefore, a need for a method, system and apparatus that tracks online web activity that does not use the preplacement of invasive methods such as cookies or web bugs.

An interesting aspect of some existing data tracking methods is that they are limited to tracking web pages as a whole. Web pages usually consist of a combination of various media and some existing tracking methods cannot discern with any certainty specifically what the user was viewing on each web page. For instance, current tracking methods cannot discern when a user is viewing a specific item on a web page from Site A and also a specific item on a web page from Site B simultaneously. The owner of Site A can only know what page the user views on Site A, but has no way to gather data regarding Site B. An advertiser can place a banner ad on the web pages of both Site A and B, but still does not know what specific item the user viewed on those pages, only that pages were shown to the user. There is, therefore, a need for a method, system and apparatus that allows tracking of specific content that a user chooses to view from web pages. There is also, therefore, a need for a method, system and apparatus that allows tracking of specific visual content that the user chooses from multiple web pages or web sites simultaneously.

Another aspect of the current invention pertains to searching for content on the World Wide Web. Many "'search engines" exist today, but users often lack the required skills to use them as efficiently as possible. In order for a search engine to return relevant results to a query, the user must know how to format search criteria. This means the user must know what key words to query, and what combination of key words to use. Users will often not use the correct key words, causing the search results to have little relevance.

Furthermore, because a web page can be comprised of many elements or topics, there may be confusion as to what element in the page to search. If the user were to search a particular web page or site for related information, the user usually gets results relevant to that page, not a specific element of that page.

For instance, if the user were interested solely in one product on a web page, and used existing search engines to search for related sites, the user would likely get results that include sites similar to the site he is on. However, such a user would not get results indicating sites that are both similar to the site and contain the specific product. A real world example might be that of a woman searching for a shoe store that sells a specific brand of shoe. The woman knows that she can find many shoe stores, but she is only interested in shoe stores that carry the brand of shoe she is looking for. This is known as a Boolean or compound query, where more than one search criterion must be met in order to satisfy the search results. There is, therefore, a need for a method, system and apparatus that allows users to search for related sites or information based on selected specific visual content that the user chooses to view from a web page or pages.

With the rapid development and general acceptance of the World Wide Web as the ultimate medium and resource library, software and hardware applications have been developed to help use, organize, and share some of these resources. E-Mail is one of the most popular applications used today. Email, however, is not capable of addressing all of the aforementioned concerns or issues that users encounter online.

SUMMARY OF THE INVENTION

The invention provides a system, method and apparatus for selecting, displaying, managing, tracking and transferring access to content accessible by computing devices, such as content in web pages, pop-up windows, players and plug-ins available on the World Wide Web, word processor documents, spreadsheets, and other like content. The selected content can be in the form of plain text, or can be in the form of static or dynamic graphic images, such as pictures, movies, animations, web casts, "3-D" images, or the like. Further, using the system, the User can select several different content items, of the same type or of different types, and place all of the items in an independent browser window.

Importantly, the content placed in the independent browser window only contains the content selected by the User, and does not contain other content which may be present in the original source of the content. For example, a User may wish to select a specific image or string of text from a web page containing several images or a lengthy text section. Thus, the system allows the User to create an independent window with only the desired content item, free from other content items on the source, which permits the User to focus on the desired content item. Thus, the system provides a heretofore unavailable ability for a User to create a grouping, or custom selection of content available from the World Wide Web or other sources.

The system also provides the ability to adjust both the size of the entire independent browser window, and, separately, the size of each content item within the window. Other important capabilities of the system include the ability to easily search for content similar to the selected content and the ability to transfer access to the custom selection to others via electronic mail, instant messenger applications, and other electronic communications methods.

The invention is effected, in part, by software added to the User's computing device, which is preferably in the form of a plug-in to an Internet browser, such as the Internet Explorer™ Internet browser of Microsoft Corporation or the Netscape Navigator™ Internet browser of Netscape Corporation, or similar content viewing applications. The software on the User's computing device modifies the User's browser to allow the User to select desired content from a web page or other document or spreadsheet, or the like, and to place the desired content in an independent browser window, free from other content on the source web page or document. To access functions provided by the software, the software creates a toolbar on the browser, the Main Toolbar, having menu items or icons which activate the functions.

In a preferred form, the software allows the User to select desired content from a web page by directing the mouse pointer over the content, depressing the right mouse button (i.e., "right click") and choosing a Select Content Function offered in an otherwise standard pop-up menu. (In the drawings included herewith, the Select Content Function on such pop-up menu is identified by the word "Amplify" ™). In the case of a text selection, the User preferably first defines the desired text by using the standard "click and drag" method and then the "right click" method.

For some types of content, such as media content, the system may place a floating icon over the content when the mouse is directed over the content. The floating icon can be used (clicked on) to select the content item with one click. Preferably, the floating icon appears as an overlay on top of the content item and only appears when the User directs the mouse pointer over the content item. Thus, the floating icon does not ordinarily obscure the content item.

After the User selects the content, the software may present the User with a Properties Window that allows the User to enter a descriptive Description for the Custom selection being created by the User, and allows the User to enter Keywords for the custom selection. As described in detail below, the software uses the Keywords to perform searches for similar content on the World Wide Web.

Next, the software creates an independent browser window, the Custom Selection Window, containing only a relatively small toolbar, the Window Toolbar, and the custom selection of the content items selected by the User. This allows the User to select and focus on desired content free from additional, and possibly distracting, content on the source page.

Preferably, the Custom Selection Window is of a predetermined size and may be resized by the User in the known manner of resizing windows. Also, preferably, the content selected by the User is set to occupy specific percentages of the height and width of the window (other than the Window Toolbar), such as 100%. Thus, when the User adjusts the height or width (or both) of the Custom Selection Window, the browser adjusts the dimensions of the content within the window proportionately.

Certain content available on the World Wide Web, such as movies, animations and web casts, 3-D images and the like, may require that additional software be present on the User's computer. Such additional software includes media players such as Microsoft's Windows Medial Player, Real Media's Real Player, Apple's Quicktime, and other similar media players, and includes other "applets", plug-ins, applications and programs. The User would need to install this software prior to using the system of the invention for these types of content.

The system allows the User to have several instances of the Custom Selection Window open simultaneously, each window containing a different custom selection. If additional software is required to view a content item in a Custom Selection Window, such as a media player or applet, or the like, the additional software is preferably defined within the Custom Selection Window as an "embedded object", which allows multiple instances of the additional software to operate on the computing device at the same time. In this manner, the User can select and view several content items requiring the same additional software simultaneously.

This system also allows the User to add additional content items to an existing Custom Selection Window. The User can preferably define whether the additional content item is to appear above, below, to the right, or to the left of an existing content item. The process can be repeated to populate a Custom Selection Window with yet more content items.

The several content items contained within one Custom Selection Window are each placed within an individual frame created within the window, which frames are preferably set to collectively occupy specific percentages (e.g., 100%) of the height and width of the Custom Selection Window (not including the Window Toolbar, as discussed above). Further, as with a single content item, each of the several content items is preferably set to occupy specific percentages (e.g., 100%) of the height and width of its respective frame. The User may also preferably resize the frames. Thus, when a frame for a content item is resized, the browser resizes the content within that frame, and, importantly, resizes the other frames (and the content therein), proportionately. It can be appreciated that the ability to arrange, size and resize multiple content items within one independent browser page gives the User great flexibility when creating custom selections.

Preferably, each frame of a Custom Selection Window includes a toolbar, the Frame Toolbar, having predefined functions that are applied with respect to the specific content item located in the frame, as opposed to Window Toolbar which has functions that are applied with respect to the Custom Selection Window as a whole. For example, the Frame Toolbar preferably contains icons that allow the User to divide (and sub-divide) each frame to allow the User to populate the Custom Selection Window with multiple content items, as described above. Preferably, the Frame Toolbar appears as an overlay to the content item within the frame and only appears when the User directs the mouse pointer over the content item (i.e., on a so-called "mouseover" event). Thus, the Frame Toolbar does not ordinarily cover or otherwise obscure the content item located within the frame.

The Frame Toolbar preferably provides a menu item or icon to select the content item located within the respective frame and place the content item in a new Custom Selection Window in a manner similar to selecting content from an original source page. Thus, using this function, the User can pick desired content items out of an existing Custom Selection Window. In addition, the Frame Toolbar preferably includes a menu item or icon to Refresh the content item in the respective frame. The Window Toolbar also preferably provides a similar function to refresh all of the content items within a Custom Selection Window simultaneously.

Once a Custom Selection Window is created, the system provides the ability to search the World Wide Web for content similar to the selected content. To perform such a search, the User can select a Search function provided by the software, which is preferably accessible via an icon on the Window Toolbar of the Custom Selection Window or on the Frame Toolbar. Upon receiving such a search command, the software opens a new browser page and queries a predetermined World Wide Web search engine, such as google.com, or the like, with certain Search Parameters. The Search Parameters are created from a group including the domain name of the source of a content item in the Custom Selection Window, the title of the original web page of the content item, and the Keywords. Preferably, the search can be performed on the basis of the Search Parameters of the entire Custom Selection Window (via the Window Toolbar), or on the basis of an individual content item within a frame of the Custom Selection Window (via the Frame Toolbar).

The result of the search is an independent browser window containing "hits" returned by the search engine, which should be relevant to the selected content or source of the content. As is common, the hits are typically in the form of short descriptions of the search results accompanied by hypertext links, or universal resource locators (i.e., url's), which lead to web pages.

The system also provides the ability for the User to open a new browser window containing either the entire web page of a selected content item, or containing the main or "home" web page of the domain for the selected content. These functions, the GoTo This Page and GoTo This Site functions are preferably made available via menu items or icons on the Window Toolbar or via menu items or icons on each Frame Toolbar. Thus, the system provides a quick and convenient means to find and view the source of selected content items.

Further, the system provides the ability to maintain the Custom Selection Window as the "top" window on the computing device. This function, the Always On Top function, is preferably made available via a menu item or icon on the Window Toolbar. When the Always On Top function is selected (i.e., "on"), the Custom Selection Window will remain visible as the top window on the computing device irrespective of whether the User selects another window, such as another program, as the active window. With this function, the User can quickly and conveniently select and focus on a desired content item, such as a streaming video, and ensure that the content item is always visible even if the User is working with another program. As mentioned above, the User can resize and relocate the Custom Selection Window to view other programs, as desired.

The system also provides the ability for the User to save a Custom Selection Window for later viewing. One mode of this feature creates a Most Recently Used (MRU) list, or History, which saves a predetermined number (e.g., 20) of the last saved custom selections, in chronological order of use. Another mode of this feature, the Send to Favorites function, creates a semi-permanent list of Favorites. A Favorites List is preferably made available via a menu item or icon on the Window Toolbar. Preferably, the Main Toolbar, accessible on the main browser, includes a retrieval function, the GoTo Favorites function, accessible via a menu item or icon. When selected, the GoTo Favorites function displays a list of saved Custom Selection Windows, which are identified by the Description entered by the User when creating the Custom Selection Window. Thus, once a Custom Selection Window is sent to Favorites, the User can quickly and conveniently recreate the window at a later time by choosing the selection from the list of Favorites. The system also provides a convenient means for the User to print the Custom Selection Window. The Send To Printer function is preferably made available via a menu item or icon on the Window Toolbar.

Importantly, the system also provides the ability for the User to transfer a Custom Selection Window to another computing device (a Recipient) via electronic mail, instant messenger programs, or other similar electronic communication means. This function, the Send To Friends function, is preferably made available via a menu item or icon on the Window Toolbar. Upon selecting the Send To Friends function, the software presents the User with a dialog window to enter the Electronic Address of the Recipient (e.g., the email address, or instant messenger name). The software also preferably provides the ability to save the Electronic Addresses of Recipients, identified by a descriptive Recipient Name entered by the User, in a Friends List for future use.

When a Recipient is entered (or chosen), the software sends a Definition of the Custom Selection Window to a Server. The Definition includes a predefined, unique identifier for the sender (the User Identifier), the Description, the arrangement and sizes of the frames in the window and the Keywords. For image content, the Definition also includes the universal resource locator (url) for the image content. For text content, the Definition also includes either the entirety of the selected text or the url for the source of the text and parameters that define the location of the beginning and end of the selected text within the source of the text.

Upon receipt of the Definition, the Server assigns a unique Window Identifier to the Custom Selection Window. At this point, an electronic message is sent to the Recipient at the Electronic Address of the Recipient via electronic mail, instant messaging program, or other electronic means, as appropriate. The electronic message sent to the Recipient contains a hypertext link, or universal resource locator (url) which leads back to the Server. As described below, the link contains the Window Identifier of the Custom Selection Window. The electronic message can be sent by the Server or can be sent by the computing device of the User. In the case where the electronic message is sent by the User, the Server transmits the Window Identifier of the Custom Selection Window to the User and the Window Identifier is incorporated into the electronic message as described above.

The presence of the Keywords in the Definition provide an important function by allowing the creator of the custom selection to provide targeted words to search for related content on the web. As a part of the Definition, the Keywords are attached to the Custom Selection Window and remain with the Custom Selection Window when it is saved by the User (or sent to the Favorites List), and travel with the Custom Selection Window when the Custom Selection Window is accessed by a Recipient.

It should be noted that the electronic message sent to the Recipient does not contain the content items themselves, but only a link to the Server. As opposed to prior methods of sending entire content items to a recipient, the present invention greatly reduces the time and bandwidth required to send an electronic message to another to share content over a network such as the World Wide Web. Moreover, electronic messaging systems often have limitations in the type and amount of content that each can transmit in a single message. For example, electronic mail systems typically limit messages to a certain size and instant messaging systems typically do not allow the transfer of images and typically limit the amount of text in a message to a certain number of characters. The present invention overcomes these limitations by sending an electronic message containing a link used to re-create the custom selection.

Upon receiving the electronic message, the User can recreate the Custom Selection Window by selecting, or clicking on, the hypertext link in the message. When the Recipient selects the link within the electronic message, the computing device of the Recipient activates a browser application that sends a request to the Server, which request contains the unique Identifier of the Custom Selection Window. The Server responds with a web page that recreates, on the computing device of the Recipient, the custom selection as defined by the sender.

Importantly, preferably a standard browser application can create a Recipient Window containing the custom selection without the additional software required to initially create and send the custom selection. Therefore the User is able to transmit access to the custom selection to another computing device on the network, even if the other computing device does not have the additional software required to initially create the custom selection.

Preferably the Recipient Window is configured to load the content items of the custom selection via the browser application on the computing device of the Recipient directly from the respective sources of the content. Thus, by employing the browser application on the computing device of the Recipient to retrieve and load the content items, the system of the present invention avoids the content type and size limitations of electronic messaging systems, as discussed above.

The Recipient Window also preferably includes a tool bar, the Recipient Toolbar, that provides certain functions to the Recipient related to the custom selection in the Recipient Window. The Recipient Toolbar preferably includes Search, Goto This Page, GoTo This Site, and Print functions, similar to those functions provided by the Window Toolbar, to allow the User to search the World Wide Web for content related to the content in the Recipient Window, to open another browser window with either the source web page containing the content item or the web site of the domain of the source web page, or to print the Recipient Window.

As mentioned above, the custom selection received by the Recipient includes the Keywords in the Definition, which allows the Recipient to perform targeted searches of the web for related content.

The initial web page sent to the Recipient preferably senses whether the Recipient has installed the software on their computing device. If so, the Recipient has the full functionality of the Custom Selection Window, including the functionality of the Window Toolbar, as described above. In particular, the Recipient has the ability to save the Custom Selection Window to the History List, the Favorites List and has the ability to transfer access to the Custom Selection Window to other computing devices, among the other functionality described above.

The software is preferably compatible with several different computing platforms, such as Microsoft Windows-based and Apple computers, internet appliances, personal digital assistants (PDAs, such as the Palm Pilot, and the like), and other computing platforms, such that custom selections can be shared among Users of various computing devices. Further, certain items of User-defined attribute information, such as the User's Favorites and the Friends List, are preferably portable amongst various computing devices of the User. The software accomplishes this function by transmitting the attribute information to the Server and storing the information along with the unique User Identifier. The User's attribute information is retrieved using the User Identifier when the User first launches the browser. Thus, the system provides a consistent and familiar experience regardless of which computing device the User chooses.

The system also provides a highly accurate and flexible means to track content viewed and shared by Users and Recipients. The Server is contacted whenever a custom selection is saved to or chosen from the Favorites list, when a custom selection is sent to another device using an electronic message, and when a Recipient views a received custom selection. During each of these actions, the unique Identifier of the custom selection is sent to the Server, which Server contains the Definition of the custom selection. Therefore, in the case of custom selections of a User's Favorites List, the system can track and compile statistics including regarding what content items have been selected, what content items are selected in the same window, the number of times a selected item (or group of items) is viewed, and the frequency of viewing. Such statistics can be compiled along with the unique User Identifier to track such information with respect to a particular User, or can be compiled "blind" without regard to a particular User.

For custom selections shared with others, the system can also track and compile statistics on what content items (or groups) are shared with others (and by whom), the number of times a Recipient views a selection, the frequency of viewing, and the chosen method of messaging. As an example, the system can track statistics regarding a User viewing (and likely comparing) images of two products side-by-side in a custom selection, and can track statistics about any sharing of that custom selection. This tracking can be accomplished whether the two images are on the same site or different sites.

Further, the system does not rely on pre-placed tracking devices, such as "cookies" or "web bugs." The tracking capability of the present invention is based on the content items themselves, in their unaltered format. Moreover, the tracking capability of the system is highly targeted in that it is able to track viewing and transferring of specific content items, whereas traditional tracking methods such as cookies and web bugs typically only track views of entire web pages. Further, since communication with the Server is required for certain actions, such as saving and retrieving, the tracking capabilities of the system cannot be circumvented. Therefore, the system provides a very non-invasive reliable, highly targeted and flexible tracking system.

It can be appreciated that the present invention provides a convenient method for a User to create, view, modify, print and save custom groupings of image and text content items available on web pages and other sources, to search for other related content, and to transfer access to such selections with others, which method is effected in a manner which avoids the limitations of electronic communications methods, which reduces the time and bandwidth required to share the custom groupings via electronic messages, and which provides for highly accurate and flexible tracking of such content viewing and sharing.

BRIEF DESCRIPTION OF THE DRAWINGS

For a complete understanding of the above and other features of the invention, reference shall be made to the following detailed description of the preferred embodiments of the invention and to the accompanying drawings, wherein.

DETAILED DESCRIPTION OF THE INVENTION

Figure 1:
FIG. 1 is an image of an Internet browser application showing the Main Toolbar of the present invention.

Referring to FIG. 1, to employ the present invention, the User installs software on the User's computing device that adds functionality to the Internet browser application and operating system of the User's computing device. Upon installation of the software, the software communicates with a remote Server that assigns a unique User Identifier for the User and transmits the User Identifier to the User's computing device, which stores the User Identifier on a memory device for later use.

Selecting Content Items

The software adds a Main Toolbar 10 to the browser application 12 on the User's computing device to allow the User to create a custom selection by selecting desired content items from a web page or other document or spreadsheet, or the like, and to place the desired content items in an independent browser window, free from other content on the source web page or document. As discussed in detail below, the Main Toolbar 10 has menu items or icons that activate some of the functions.

By default, the software may analyze web pages and other types of sources upon loading into the browser application to identify content items supported by the software and to determine the network locations of the content items. A list of supported content is preferably contained in a file stored on the User's computing device, such as in a Dynamic Link Library (DLL), that can be updated automatically as new types of content become supported by the software. The Main Toolbar 10 preferably provides a menu item that allows the User to disable the automatic page scanning if desired.

Figure 2:
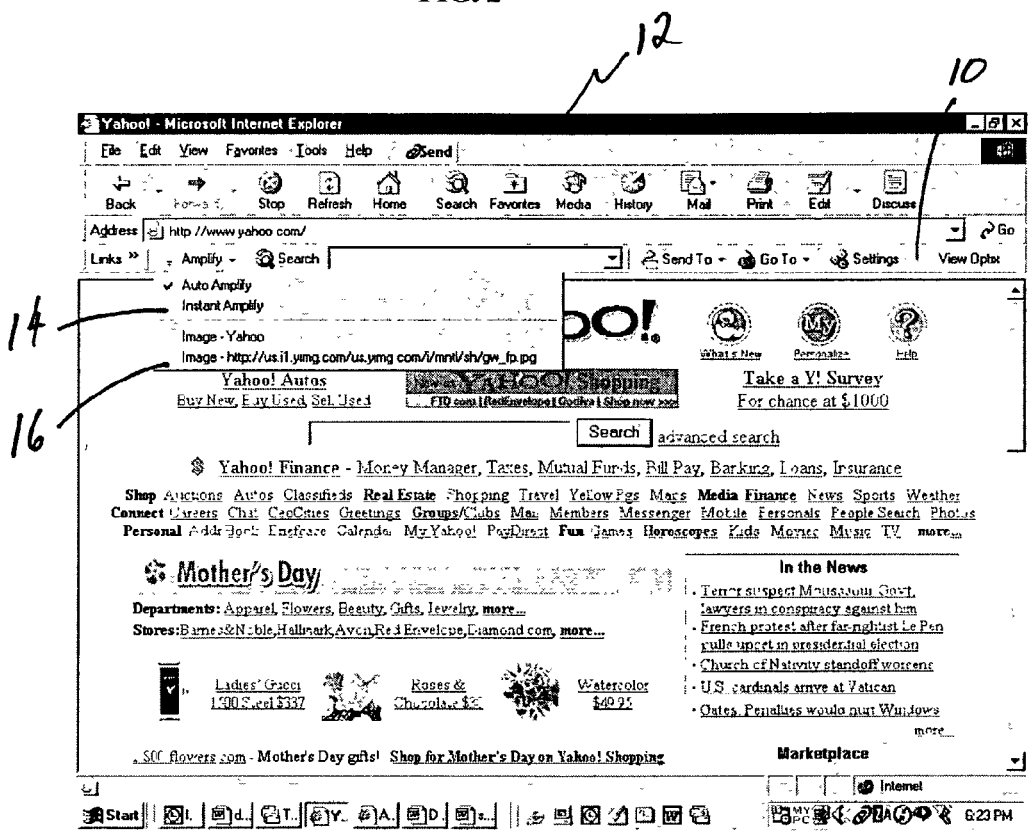
FIG. 2 is an image of the Main Toolbar showing the Identified Content Item List.

Referring to FIG. 2, the Main Toolbar 10 includes an Identified Content 14 menu item that displays an Identified Content Items List 16 of supported and identified content items in the web page or source currently loaded into the browser application. The User can select a desired content item by clicking on the item in the Identified Content Items List 16.

Figure 3:
FIG. 3 is an image of the Select Content Item Function invoked by the "right-click" method of selecting a content item.

Referring to FIG. 3, the User can also select a desired content item from a web page by directing a pointing device of the computing device (e.g., a mouse pointer) over the content item 18 in the page, depressing the right mouse button (i.e., "right click") and choosing a Select Content Item Function 20 offered in an otherwise standard pop-up menu 22. (In the drawings included herewith, the Select Content Item Function 20 on such pop-up menu 22 is identified by the word "Amplify"™).

It should be noted that, when selecting content items, the software obtains the network location and name of the content item from the web page or other source of the content item and retains the network location in memory, which is preferably temporary memory. Further, it should be noted that content items (and groups of content items) can be selected using the standard "click and drag" method and then the "right click" method.

In the case of a content item that is text, the User preferably first defines the desired text by using the standard "click and drag" method and then the "right click" method. This function is also operable to select non-text content items. A group of non-text content items or a group of text and non-text content items may be selected in a similar manner by selecting the entire group, for example using the "click and drag" method. Preferably, a select function inherent in the operating system (e.g., Windows™) is employed to obtain HTML coding or other formatting instructions for the text and/or non-text content items. It should be noted that, as used herein, the term "click" is meant to encompass any means or method by which the pointing device receives a selection command from the User.

Figure 4:
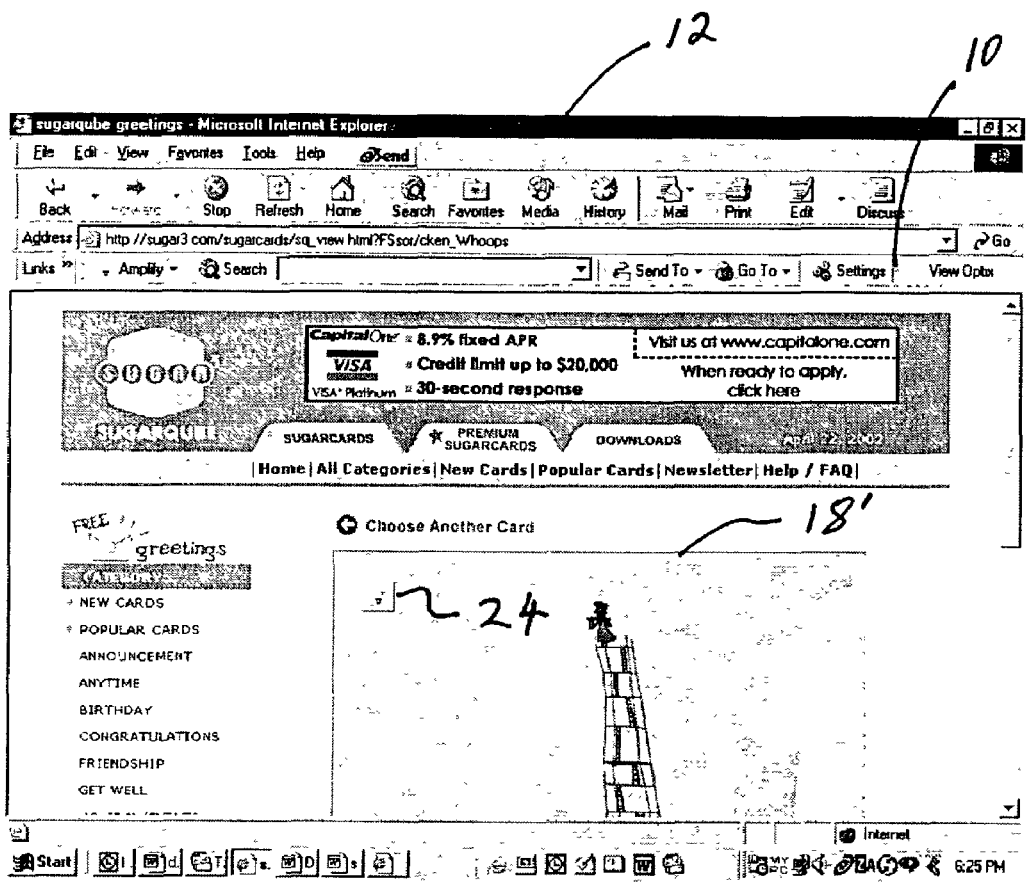
FIG. 4 is an image illustrating the floating Instant Selection Icon.

Referring to FIG. 4, for some types of content, such as media content, the system preferably places a floating, Instant Selection Icon 24 over the content item 18' when the User directs the mouse pointer over the display area or frame of the content item. The Instant Selection Icon 24 can be used (clicked on) to select the content item 18' with one click. Preferably, the Instant Selection Icon 24 appears as an overlay on top of the content item 18' and only appears when the User directs the mouse pointer over the display area or frame of the content item. Thus, the Instant Selection Icon 24 does not ordinarily obscure the content item.

Window Description and Keywords

Figure 5:
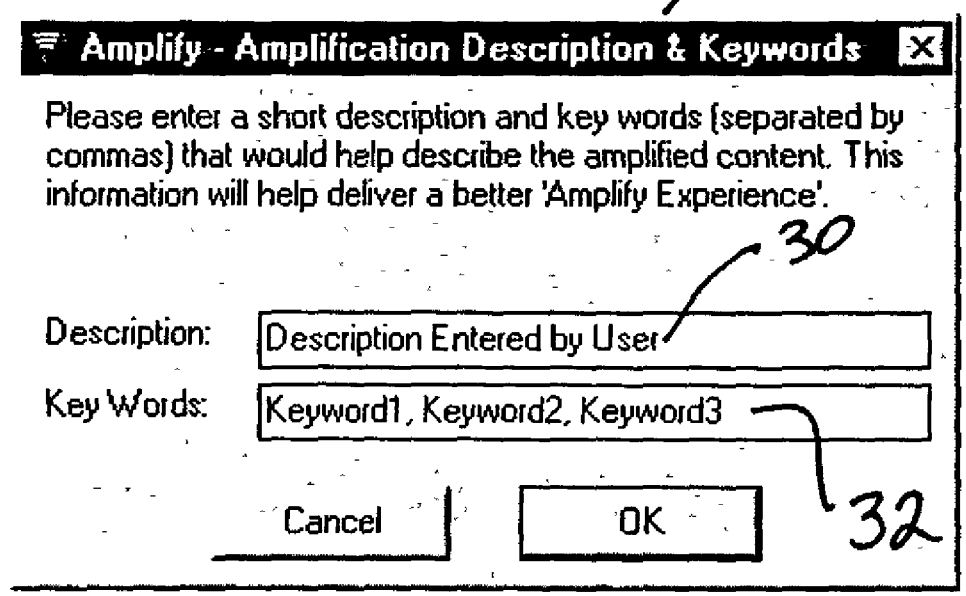
FIG. 5 is an image of the Properties Window.

Referring to FIG. 5, after the User selects the content item, the software may present a Properties Window 28 that allows the User to enter a Description 30 for the custom selection being created by the User, and allows the User to enter Keywords 32 for the custom selection. As described in detail below, the software uses the Keywords 32 to perform searches for similar content on the World Wide Web.

The Custom Selection Window

Figure 6:
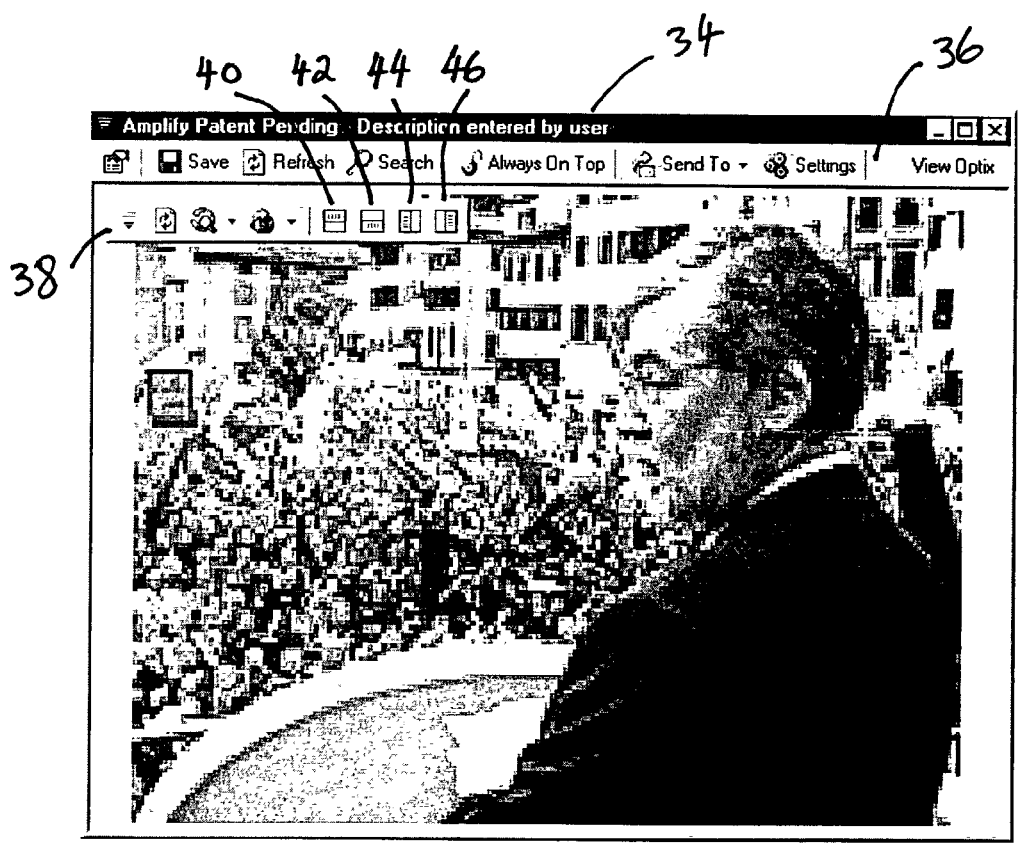
FIG. 6 is an image of a Custom Selection Window having a single image content item.

Referring to FIG. 6, the software then creates an independent browser window, the Custom Selection Window 34, containing only a relatively small toolbar, the Window Toolbar 36, and the custom selection of the content item 18 selected by the User. This allows the User to select and focus on desired content free from additional, and possibly distracting, content on the source page. The network location of the content item is retrieved from the (temporary) memory to which it was stored during the selection process.

The software preferably loads the content item into the Custom Selection Window 34 directly from the original (network) source of the content item identified during the selection process. It is intended that the term network source as used herein include any cached source that may be present on the network.

Preferably, the Custom Selection Window 34 is of a predetermined size and may be resized by the User in the known manner of resizing windows. Also, preferably, the content item 18 selected by the User is set to occupy specific percentages of the height and width of the window (other than the Window Toolbar 36), such as 100%. Thus, when the User adjusts the height or width (or both) of the Custom Selection Window 34, the browser application adjusts the dimensions of the content item 18 within the window proportionately. However, the system preferably maintains any original aspect ratio settings of the content item.

Certain content available on the World Wide Web, such as movies, animations and web casts, 3-D images and the like, may require that additional software be present on the User's computer. Such additional software includes external player programs (such as Microsoft's Windows Medial Player, Real Media's Real Player, Apple's Quicktime, and other similar media players), helper application, "applets", plug-ins, and other programs. The User would need to install this software prior to using the system of the invention for these types of content.

The software allows the User to have several instances of the Custom Selection Window 34 open at any given time, each window containing a different custom selection. If additional software is required to view a content item in a Custom Selection Window 34, such as a media player or applet, or the like, the additional software is preferably defined within the Custom Selection Window as an "embedded object", which allows multiple instances of the additional software to operate on the computing device at the same time. In this manner, the User can select and view several content items requiring the same additional software at the same time.

Inserting Additional Content Items into a Custom Selection Window

Figure 7:
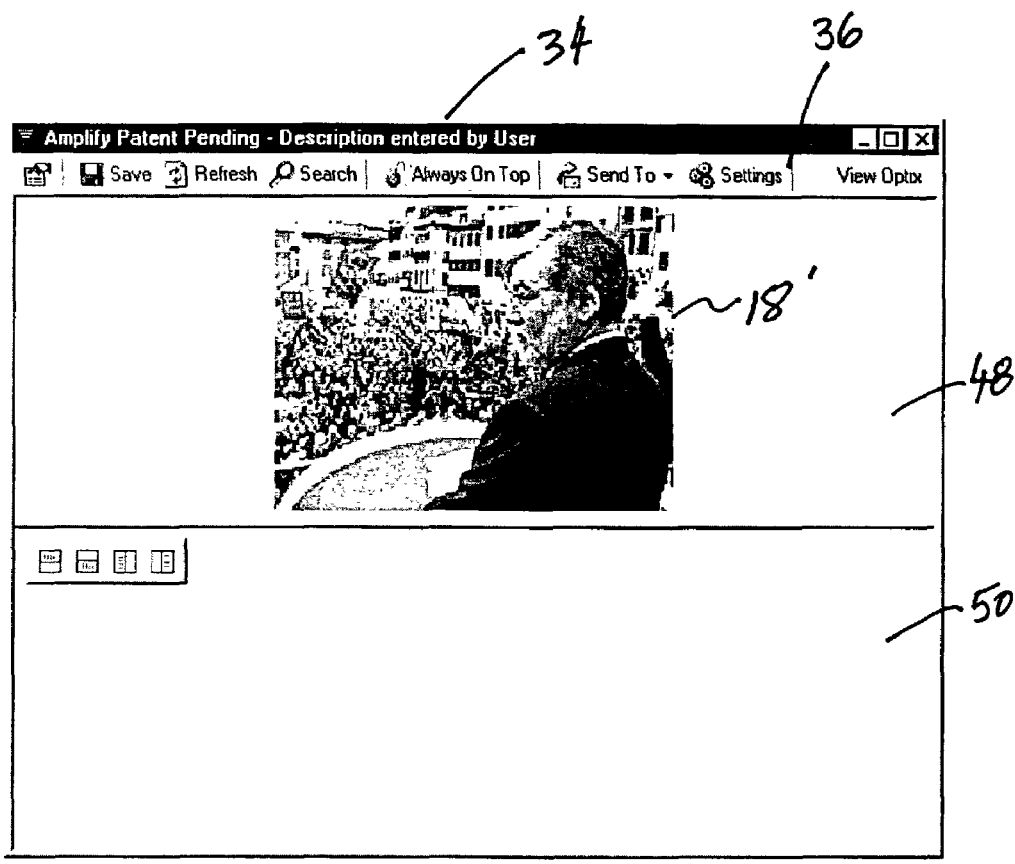
FIG. 7 is an image of a Custom Selection Window having a content item in a top frame and a blank bottom frame.

Referring to FIGS. 6 & 7, the software also allows the User to add additional content items to an existing Custom Selection Window 34. To do this, the User preferably first divides a Frame 37 of an existing content item 18 in the Custom Selection Window 34 to add a new frame to the window. The Frame Toolbar 38, which appears over the content item 18 in the Custom Selection Window 34, includes New Frame Bottom, New Frame Top, New Frame Right, and New Frame Left icons 40, 42, 44, 46 (or menu items) that add a new frame below, above, to the left or to the right, respectively, of the existing content item 18. The software preferably divides the frame 36 of the selected content item 18 into two, equal, sub-frames 48, 50, with one of the frames 48 occupied by the existing content item 18 and the other frame 50 blank. Then, the User selects an additional content item in the manner described above.

Figure 8:
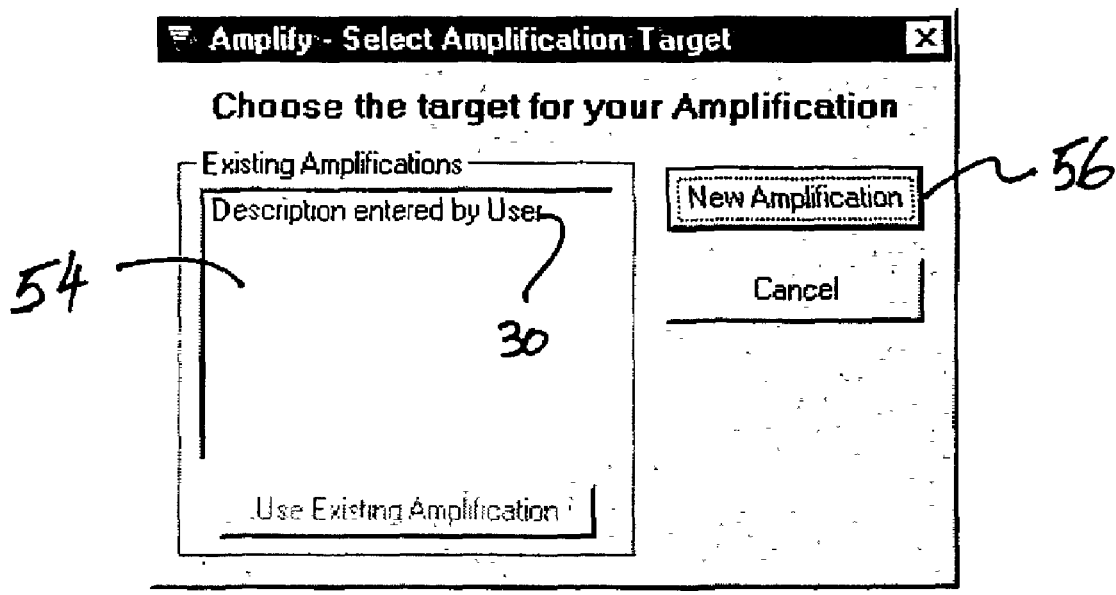
FIG. 8 is an image of the Select Target Window.

Referring to FIG. 8, upon the selection of an additional content item, the software determines whether there exist other, open Custom Selection Windows. If so, the software presents a Select Target Window 52, that displays an Open Window List 54 of all open Custom Selection Windows, which are preferably identified by the Description 30 entered by the User when creating the windows. Preferably, the User can select an open window from the Open Window List 54. The Select Target Window 52 also preferably provides a New Window 56 button, icon or menu item to allow the User to place the content item in its own Custom Selection Window, if desired.

Upon the selection of an open Custom Selection Window as the target, the software displays the selected Custom Selection Window 34, which includes the frame 48 occupied by the existing content item 18 and a blank frame 50 (as shown in FIG. 6). If the Custom Selection Window 34 contains more than one blank frame, the software then preferably pauses and prompts the User to select the blank frame in which to place the additional content item. The User can select the desired blank frame by clicking within the border of the frame. If the Custom Selection Window 34 contains only one blank frame then the software may automatically place the additional content item within that frame.

Figure 9:
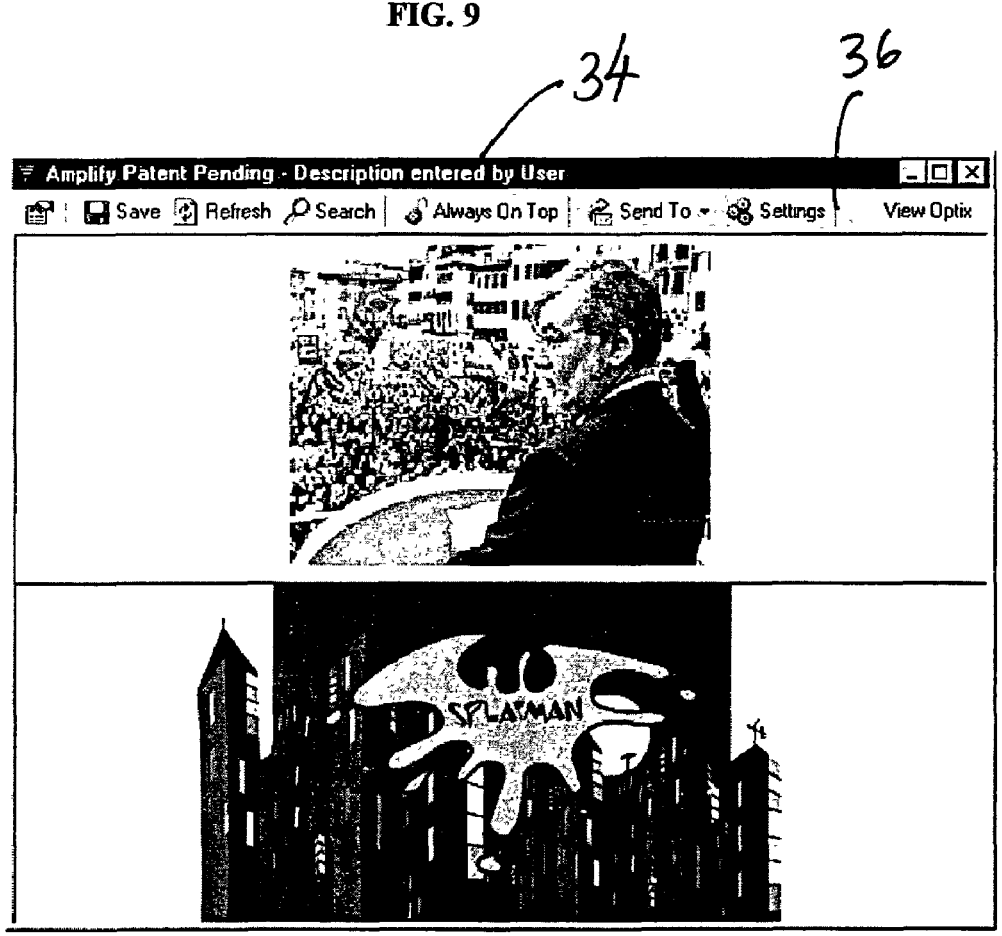
FIG. 9 is an image of a Custom Selection Window having an image content item in a top frame and an animation content item in a bottom frame.

Referring to FIG. 9, the software then displays the modified Custom Selection Window 34, which now contains both the first content item 18 (e.g., in the top frame 48) and the additional content item 58 (in the bottom frame 50).

Figure 10:
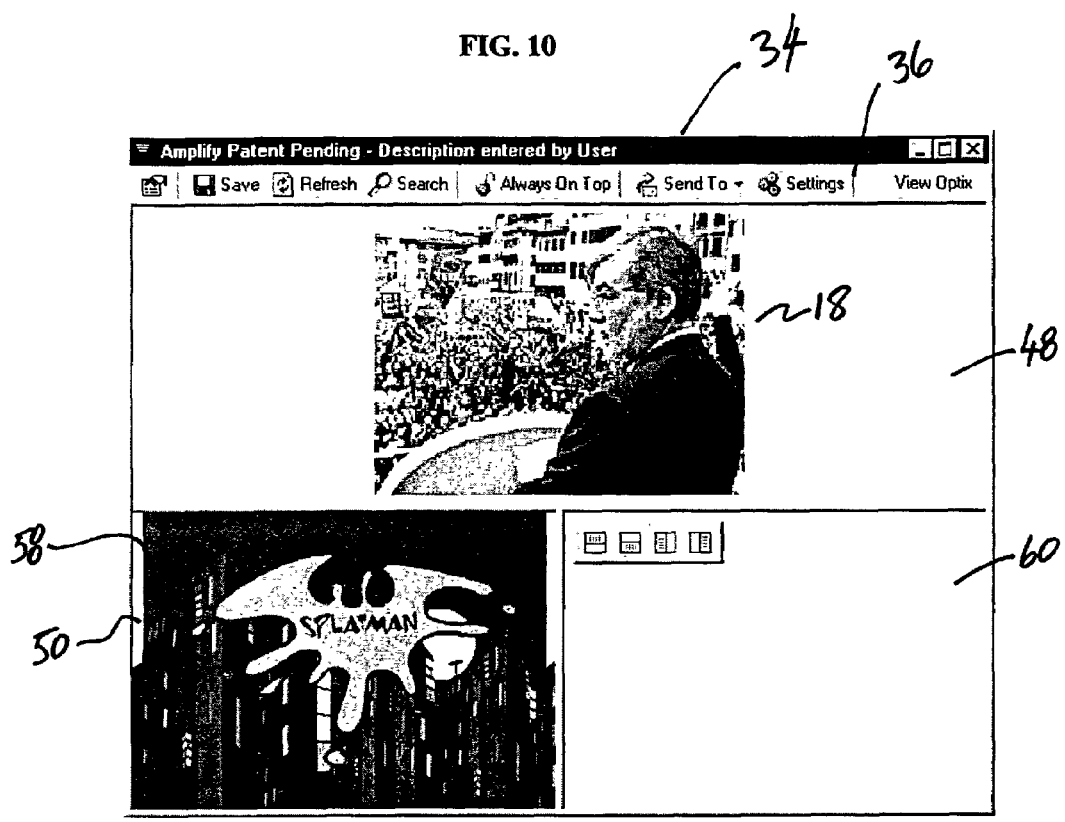
FIG. 10 is an image of a Custom Selection Window having a bottom frame divided into right and left frames.
Figure 11:
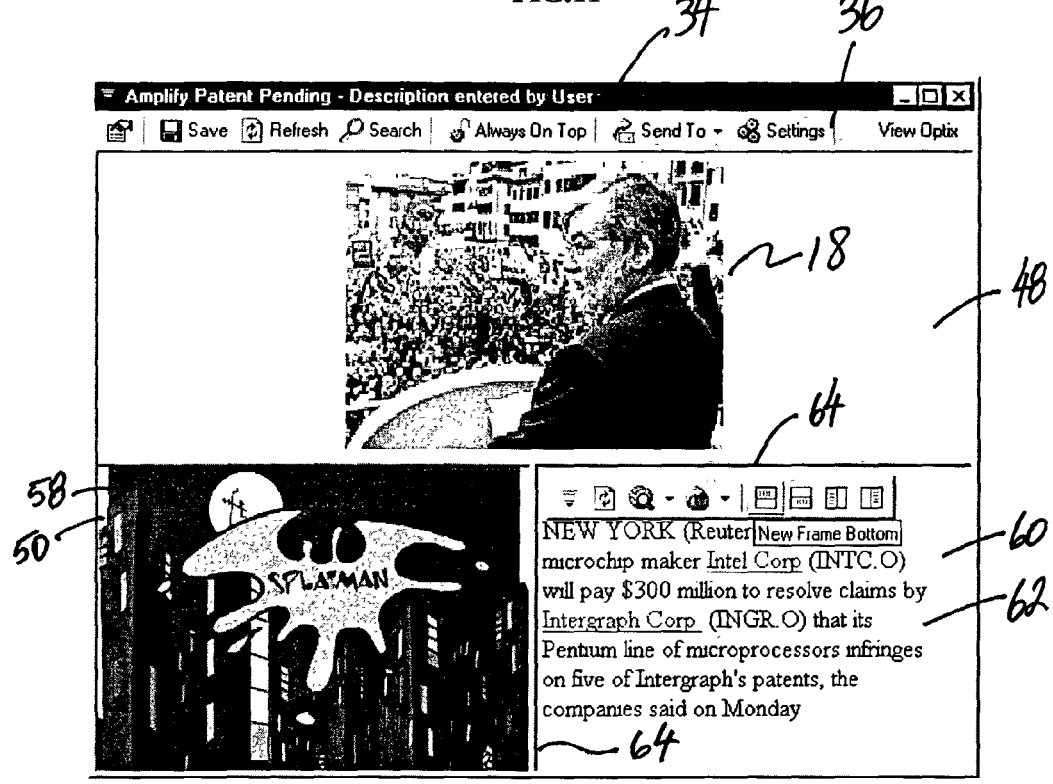
FIG. 11 is an image of a Custom Selection Window having an image content item in a top frame, having an animation content item in a left bottom frame and having a text content item in a right bottom frame.

Referring to FIGS. 10 & 11, the process can be repeated to populate the Custom Selection Window 34 with more content items. In this case, a new frame 60 is added to the right of the bottom frame 50. As above, the new frame 60 is added by selecting the New Fame Right icon 44 in the Frame Toolbar 38 (not shown) of the bottom frame 50 to add a frame to the right of the bottom frame 50. As shown, a text selection content item 62 can then be placed in the new frame 60 in the manner described above.

The software preferably defines the frames of the Custom Selection Window (in HTML) to collectively occupy specific percentages (e.g., 100%) of the height and width of the Custom Selection Window (not including the Window Toolbar 36). Further, as with a single content item, each of the several content items is preferably set to occupy specific percentages (e.g., 100%) of the height and width of its respective frame. The User may also preferably resize and rescale the frames in a Custom Selection Window by relocating a border between frames by clicking on and dragging a border 64 to a new location. When the frame border is relocated, the browser application resizes both of the content items within the frames that share that border 64, proportionately. However, the system preferably maintains any original aspect ratio settings of the content item. It can be appreciated that the ability to arrange, size and resize multiple content items within one independent browser page gives the User great flexibility when creating custom selections.

As a first step in creating the Custom Selection Window 34, the software first determines what type of content has been selected and determines whether there exists other open Custom Selection Windows. An example of the code for these steps is set for the in Table A.

TABLE A

```
'Public Sub Amplify(ByRef oSourceDocument As MSHTML.HTMLDocument, ByRef oAmplifyObject As Object)
    'Paramaters
    '       oSourceDocument - An object reference to the document that the item being amplified originated from
    '       oAmplifyObject - An object reference to the item being amplified
    Public Sub Amplify(ByRef oSourceDocument As MSHTML.HTMLDocument, By Ref oAmplifyObject As Object)
        Dim xmlAmplifyItem As MSXML.DOMDocument
        'Determine what type of content is being amplified
        Select Case TypeName(oAmplifyObject)
            Case "HTMLImg"
                Set xmlAmplifyItem = AmplifyHTMLImg(oSourceDocument, oAmplifyObject)
            Case "IHTMLTxtRange"
                Set xmlAmplifyItem = AmplifyIHTMLTxtRange(oSourceDocument, oAmplifyObject)
            Case "HTMLObjectElement"
                Set xmlAmplifyItem = AmplifyHTMLObjectElement(oSourceDocument, oAmplifyObject)
        End Select
        If Not xmlAmplifyItem Is Nothing Then
            'If there is already an amplification window showing, then give
            'the user the choice of using a new or existing window
            If 1AmplifyCount > 0 Then
                'Show window choice form
                Dim oAmplifyForm As New Amplify.frmAmplify
                Load oAmplifyForm
                Set oAmplifyForm.AmplifyItem = xmlAmplifyItem
                ShowWindowEx oAmplifyForm.hWnd
                Set oAmplifyForm = Nothing
            Else
                'No windows existed, create a new one
                Dim oAmplification As New Amplify.Amplification
                oAmplification.Load
                oAmplification.AddItem xmlAmplifyItem
                Set oAmplification = Nothing
            End If
        End If
        Set xmlAmplifyItem = Nothing
    End Sub
```

The software then defines certain parameters of the content item, such as the source page or document of the content item and the file name of the content item. An example of this step, for an image content item, is set forth in Table B.

TABLE B

```
'Private Function AmplifyHTMLImg(ByRef oSourceDocument As MSHTML HTMLDocument, ByRef oImage As MSHTML.HTMLImg) As MSXML.DOMDocument
    'Parameters:
    '       oSourceDocument - An object reference to the document that the item being amplified originated from
    '       oImage - An object reference to the image being amplified
    'Return Value
    '       MSXML DOMDocument object containing the xml structure of the image
    Private Function AmplifyHTMLImg(ByRef oSourceDocument As MSHTML HTMLDocument, ByRef oImage As MSHTML HTMLImg) As MSXML DOMDocument
        Dim xmlImage As New MSXML DOMDocument
        xmlImage async = False
        LoadResXML xmlImage, "amplifyimage xml"
        BuildSourceNode xmlImage.selectSingleNode("frame/source"), oSourceDocument
        With xmlImage.selectSingleNode("frame/image")
            .selectSingleNode("src") Text = oImage.src
            .selectSingleNode("alt").Text = oImage.alt
            selectSingleNode("height").Text = oImage.Height
            .selectSingleNode("width") Text = oImage Width
            '.selectSingleNode("mime-type").Text = oImage mimeType
        End With
        Set AmplifyHTMLImg = xmlImage
        Set xmlImage = Nothing
    End Function
```

Then, the software launches a new browser application window and passes the XML structure of the image to the new window. An example of the code for this step, for an image content item, is set forth in Table C.

TABLE C

```
'Public Sub AddItem(ByRef oAmplifyItem As MSXML.DOMDocument)
    'Parameters:
    '       oAmplifyItem - An object reference to the xml containing the structure of the item being amplified
    Public Sub AddItem(ByRef oAmplifyItem As MSXML.DOMDocument)
        'Copy the xml to a local object for later use
        Set xmlItem Waiting = oAmplifyItem.documentElement cloneNode(True)
        'Set the item waiting flag
        bItem Waiting = True
        'Check to see if the choose your target splash screen should be displayed
        If CLng(GetSetting(REG_APP_NAME, REG_SECT_PREFERENCES, REG_KEY_TARGET_WINDOW_HINT,
        0)) = 0 Then
            frmChooseTarget Show vbModeless, Me
        End If
    End Sub
```

Upon the creation of the new window, the software pauses to receive an indication from the User as to the desired location of the content item within the new window. As stated above, if there is only one possible (i.e., blank) frame for the content item, then the software may automatically insert the content item in that frame. An example of the code for this step is set forth in Table D.

TABLE D

```
'Private Sub AddItem_Callback(ByRef oTargetWindow As MSHTML.HTMLWindow2, ByRef xmlItem As
MSXML.IXMLDOMNode, Optional ByRef bSetDirty As Boolean = True)
    'Parameters:
    '       oTargetWindow - An object reference to the target window for the item being amplified
    '       xmlItem - An object reference to the xml of the item being amplified
    '       bSetDirty (Optional, Default = True) - Boolean value indicating weather or not to set the
    dirty flag for the amplification
    Private Sub AddItem_Callback(ByRef oTargetWindow As MSHTML.HTMLWindow2, ByRef xmlItem As
    MSXML.IXMLDOMNode, Optional ByRef bSetDirty As Boolean = True)
        'Determine what type of content is being amplified
        Select Case xmlItem.selectSingleNode("@type") Text
            Case "HTMLImg"
                Call AddHTMLImg(xmlItem, oTargetWindow)
            Case "IHTMLTxtRange"
                Call AddIHTMLTxtRange(xmlItem, oTargetWindow)
            Case "HTMLObjectElement"
                Call AddHTMLObjectElement(xmlItem, oTargetWindow)
        End Select
        xmlAmplification.selectSingleNode("amplification/frames").appendChild xmlItem
        oAmplification.Dirty = bSetDirty
        bItem Waiting = False
    End Sub
```

In the code set forth in Table D, the software again determines the type of the content item and calls an appropriate function to populate the target frame with the content item. An example of the code to populate the target frame for an image content item is set forth in Table E.

TABLE E

```
'Private Sub AddHTMLImg(ByRef xmlImage As MSXML.IXMLDOMNode, ByRef oTargetWmdow As
MSHTML HTMLWindow2)
    'Parameters
    '       xmlImage - Object reference to the xml for the image being amplified
    '       oTargetWindow - Object reference to the target window for the image
    Private Sub AddHTMLImg(ByRef xmlImage As MSXML IXMLDOMNode, ByRef oTargetWindow As
    MSHTML.HTMLWindow2)
        Dim oImage As MSHTML.HTMLImg
        'Load the html for the image into the target window
        oTargetWindow navigate AMPLIFY_RES_PATH + "/html/amplifyimage.html"
        'Waite for the window to finish loading
        DoEvents
        Do Until oTargetWindow document.readyState = "complete"
            DoEvents
```

TABLE E-continued

```
    Loop
    'Set the base href of the window
    SetBaseHREF oTargetWindow.document, xmlImage.selectSingleNode("source")
    'Get an object reference to the empty image loaded in the window
    Set oImage = oTargetWindow.document.getElementById("oImage")
    'Set the image properties
    With xmlImage.selectSingleNode("image")
        oImage src = .selectSingleNode("src").Text
        oImage alt = .selectSingleNode("alt").Text
    End With
    'Make the image visible
    oImage.Style.visibility = "visible"
    Set oImage = Nothing
End Sub
```

The XML structure of a content item preferably includes tags related to the network location and other aspects of the source of the content item such as the protocol (e.g., http), host (e.g., amplifytheweb.com), path (e.g., /images/), page (e.g., page.html), and query. For an image item, the XML structure also preferably includes tags related to the file name (e.g., image.jpeg), alternate information (e.g., "A JPEG image"), height and width. An example of the XML structure for an image content item is set forth in Table F.

TABLE F

```
<frame id="" type="HTMLImg">
    <source>
        <protocol />
        <host />
        <path />
```

TABLE F-continued

```

<query />
    </source>
    <image>
        <src />
        <alt />
        <height />
        <width />
        <mime-type />
        <scale>Y</scale>
    </image>
</frame>
```

The HTML code loaded into a frame includes instructions that define the appearance of the content item in the frame. An example of the HTML code the frame of an image content item is set forth in Table G.

TABLE G

```
<html>
    <head>
        <base id="oBaseHREF" href="" target="_blank">
    </head>
    <body leftmargin="2" topmargin="2" bottommargin="2" rightmargin="2" onresize="ResizeImage( );">
    <table cellpadding="0" cellspacing="0" border="0" height="100%" width="100%">
        <tr>
            <td align="center" valign="middle">
                <img id="oImage" border="0" style="visibility:hidden;" onload="SetupImage( );"
                onmouseover="ShowImageToolbar( );" onmouseout="HideImageToolbar(false);"
                galleryimg="no"><br>
            </td>
        </tr>
    </table>
    <button id="btnImageToolbar" onclick="ScaleImage( );" style="position:absolute;top:0px;left:0px;background-
    color:buttonface,visibility:hidden;" onmouseout="HideImageToolbar(false);">
    </button>
    </body>
</html>
```

As discussed above, the software allows the User to divide frames of an open Custom Selection Window to insert additional content items into the window. An example of the code to divide a frame of a Custom Selection Window is set forth in Table H.

TABLE H

```
'Private Sub SplitFrame(ByRef oSplitFrame As MSHTML.HTMLFrameElement, ByRef sNewFrameLocation As String)
    'Parameters:
    '       oSplitFrame - An object reference to the frame being split
    '       sNewFrameLocation - String containing the location of the new (blank) frame
    Private Sub SplitFrame(ByRef oSplitFrame As MSHTML.HTMLFrameElement, ByRef sNewFrameLocation As
    String)
        Dim oNewFrameset As MSHTML.IHTMLFrameSetElement
        Dim oReplaceFrame As MSHTML.HTMLFrameElement
        Dim oNewFrame As MSHTML.HTMLFrameElement
        oSplitFrame.Style.border= "0px"
        If sNewFrameLocation = "NewFrameTop" Or sNewFrameLocation = "NewFrameBottom" Then
            Set oNewFrameset = oDocument.createElement("<frameset rows=""50%,50%"">")
        Else
            Set oNewFrameset = oDocument.createElement("<frameset cols=""50%,50%"">")
        End If
        Set oReplaceFrame = oSplitFrame.parentElement.replaceChild(oNewFrameset, oSplitFrame)
        Set oNewFrame = oReplaceFrame.cloneNode(False)
        oNewFrame.id = "fraAmplify" + CStr((oDocument.frames.Length + 1))
        oNewFrame.src = "about blank"
        If sNewFrameLocation = "NewFrameRight" Or sNewFrameLocation = "NewFrameBottom" Then
            oNewFrameset.appendChild oReplaceFrame
            oNewFrameset.appendChild oNewFrame
        Else
            oNewFrameset.appendChild oNewFrame
            oNewFrameset.appendChild oReplaceFrame
        End If
        Set oNewFrame = Nothing
        Set oReplaceFrame = Nothing
        Set oNewFrameset = Nothing
    End Sub
```

The HTML code that defines the frameset for a Custom Selection Window preferably defines the frames as predetermined percentages of the window. The code may also identify the Custom Selection Window by a unique Window Identifier. The code set forth in Table I below defines a frameset having a top and bottom frame for a Custom Selection Window having a Window Identifier of 579E3E1B-F2A9-42A3-91AC-1635B0A67D04.

TABLE I

```
<html>
    <head>
    </head>
    <frameset ><frameset rows="50%,50%"><frame src="amplification_view_frame.asp?amplification={579E3E1B-
    F2A9-42A3-91AC-1635B0A67D04}&frame=fraAmplify0"scrolling="no"><frame
    src="amplification_view_frame.asp?amplification={579E3E1B-F2A9-42A3-91AC-1635B0A67D04}&frame=fraAmplify1"
    scrolling="no"></frameset></frameset>
</html>
```

An example of the HTML code for a frame for an image content item for the Custom Selection Window defined by the frameset defined by the code set forth in the above Table I is set forth below in Table J.

TABLE J

```
<html>
    <head>
    <base href="http://www.amplifytheweb.com/" target="_blank">
    <script language="JavaScript">
    <!--
    var lOriginalHeight = 54;
    var lOriginalWidth = 232;
    var bScaleImage = true,
    function GetImageRatio( ) {
            var dHeightRatio = 0 0,
            var dWidthRatio = 0 0,
            if(document.body.clientHeight <= 20 || document body clientWidth <= 20) {
                dHeightRatio = 1;
                dWidthRatio = 1;
            } else {
                dHeightRatio = lOriginalHeight / (document.body.clientHeight - 4);
                dWidthRatio = lOriginalWidth / (document.body.clientWidth - 4);
```

TABLE J-continued

```
        }
            return dWidthRatio > dHeightRatio ? dWidthRatio : dHeightRatio;
    }
    function ResizeImage( ) {
        if (!bScaleImage) {
                return;
        }
        var dRatio = 0.0;
        dRatio = GetImageRatio( );
        oImage.style.height = Math.round(lOriginalHeight / dRatio);
        oImage.style.width = Math.round(lOriginalWidth / dRatio);
    }
    function ScaleImage( ) {
        bScaleImage = !bScaleImage;
        if (bScaleImage) {
            HideImageToolbar(true);
            ResizeImage( );
        } else {
            HideImageToolbar(true);
            oImage.style.height = ";
            oImage.style.width = ";
        }
    }
//-->
</script>
</head>
<body leftmargin="2" topmargin="2" bottommargin="2" rightmargin="2" onresize="ResizeImage( ),">
<table cellpadding="0" cellspacing="0" border="0" height="100%" width="100%">
<tr>
    <td align="center" valign="middle">
        <img id="oImage" src="image.jpeg" alt="" onload="ResizeImage( );"><br>
    </td>
</tr>
</table>
</body>
</html>
```

An example of the HTML code for a frame for an MPEG movie content item for the Custom Selection Window defined by the frameset defined by the code set forth in the above Table I is set forth below in Table K.

TABLE K

```
<html>
    <head>
    <base href="http://www.amplifytheweb.com/" target="_blank">
    </head>
    <body leftmargin="1" topmargin="1" bottommargin="1" rightmargin="1" bgcolor="#000000">
    <OBJECT ID="oWindowsMedia" width="100%" height="100%" classid="CLSID:22d6f312-b0f6-11d0-94ab-
0080c74c7e95"
    codebase="http://activex.microsoft.com/activex/controls/mplayer/en/nsmp2inf.cab#Version=6,4,7,1112" standby=" "
    onmouseover="this.ShowControls=1;" onmouseout="this.ShowControls=0;">
        <param name="ShowControls" value="0">
        <param name="AutoStart" value="1">
        <param name="AutoSize" value="0">
        <param name="AnimationAtStart" value="False">
        <param name="AutoRewind" value="False">
        <param name="baseUrl" value="">
        <param name="FileName" value="movie.mpeg">
        <param name="PlayCount" value="1">
        <param name="Rate" value="1">
    </OBJECT>
    </body>
</html>
```

The code set forth below in Table L defines a frameset for a Custom Selection Window having a top row of one frame and a bottom row of two frames.

TABLE L

```
<html>
    <head>
    </head>
    <frameset><frameset rows="50%,50%"><frame src="amplification_view_frame.asp?amplification={579E3E1B-
    F2A9-42A3-91AC-1635B0A67D04}&frame=fraAmplify0"scrolling="no"><framesetcols="50%,50%"><frame
    src="amplification_view_frame.asp?amplification={579E3E1B-F2A9-42A3-91AC-1635B0A67D04}&frame=fraAmplify1"
    scrolling="no"><frame src="amplification_view_frame.asp?amplification={579E3E1B-F2A9-42A3-91AC-
    1635B0A67D04}&frame=fraAmplify2" scrolling="no"></frameset></frameset></frameset>
    </html>
```

The Custom Selection Window defined by the frameset set forth above in Table L can contain the image content item (as defined by the code of Table J) in the frame of the top row, an MPEG movie content item in the left frame of the bottom row, and a text content item in the right frame of the bottom row. An example of the HTML code for a text content item comprising the text "This is the text selected by the user." is set forth in Table M.

Select Content Item (Frame Toolbar)

The Frame Toolbar 38 preferably includes a Select Content Item 66 icon to select the content item 18 located within the respective frame and place the content item in a new Custom Selection Window in a manner similar to selecting content from an original source page. Thus, using this function, the User can pick desired content items out of an existing Custom Selection Window.

TABLE M

```
<html>
    <head>
        <base href="http://www.amplifytheweb.com/" target="_blank">
    </head>
    <body leftmargin="0" topmargin="0" bottommargin="0" rightmargin="0" onload="document.body.scroll='auto';">
    <table height="100%" align="center">
    <tr>
        <td valign="middle">
            <span>This is the text selected by the user.</span>
        </td>
    </tr>
    </table>
    </body>
    </html>
```

Frame Toolbar

Figure 12:
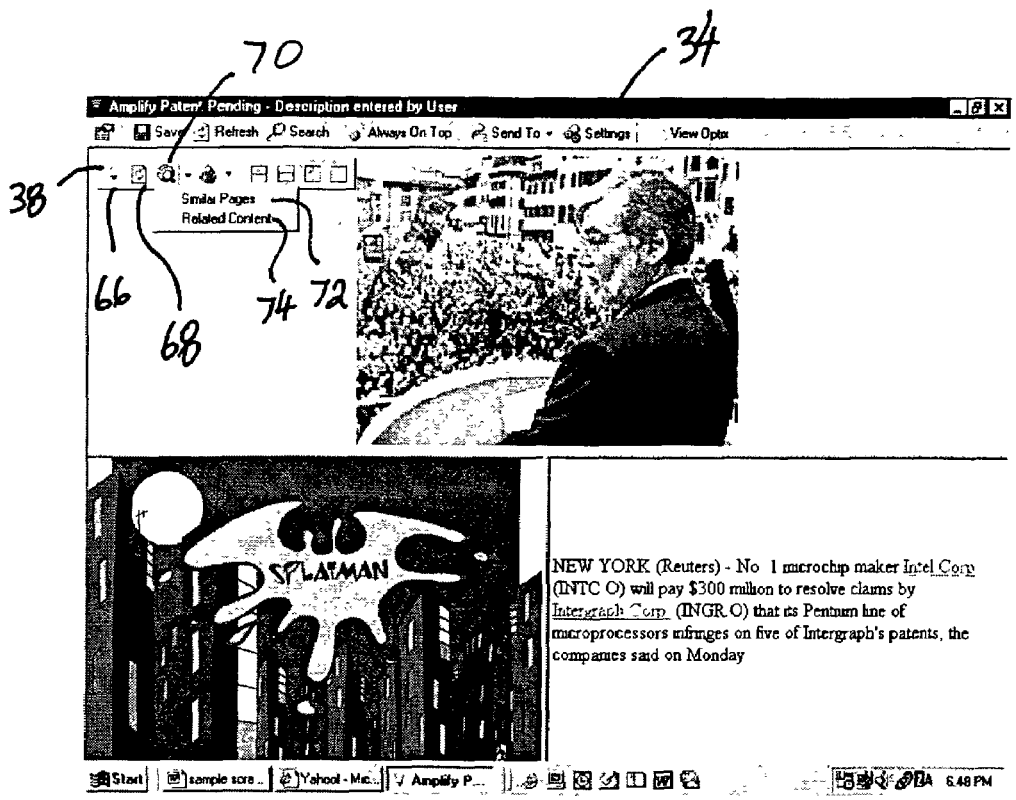
FIGS. 12 and 13 are images of a Custom Selection Window as in FIG. 11, showing a Frame Toolbar in the top frame.

Referring to FIG. 12, the Frame Toolbar 38 preferably appears as an overlay to the content item 18 within the frame and only appears when the User directs the mouse pointer over the display area or frame of the content item (i.e., on a "mouseover" event). In this manner, the Frame Toolbar 38 will disappear when the pointer exits the display area or frame. Thus, the Frame Toolbar 38 does not ordinarily cover or otherwise obscure the content item 18 located within the frame.

Refresh (Frame Toolbar)

In addition, the Frame Toolbar 38 preferably includes a Refresh 68 menu item or icon to reload the content item in the respective frame. To refresh a content item, the software first determines which frame the User has chosen to reload. An example of the code to make this determination is set forth in Table N.

TABLE N

```
'Private Sub Reload(Optional ByRef oTargetFrame As MSHTML.HTMLFrameElement)
    'Parameters:
        'oTargetFrame (Optional) - An object reference to a specific frame to be reloaded
    Private Sub Reload(Optional ByRef oTargetFrame As MSHTML.HTMLFrameElement)
    'If a target frame was passed in, then only reload that frame
    'otherwise reload all frames
    If Not oTargetFrame Is Nothing Then
        PopulateFrames oAmplification DOM selectNodes("amplification/frames/frame[@id="'ldquo;' +
        oTargetFrame id +
        "']")
    Else
        PopulateFrames oAmplification DOM.selectNodes("amplification/frames/frame")
    End If
End Sub
```

Then the code set forth in Table O calls the code set forth in Table P for each frame being reloaded.

TABLE O

```
Private Sub PopulateFrames(xmlFrames As MSXML.IXMLDOMNodeList)
    Dim i As Long
    For i = 0 To xmlFrames.Length – 1
        AddItem_Callback oDocument.frames(xmlFrames.Item(i).selectSingleNode("@id").Text),
        xmlFrames.Item(i), False
    Next i
End Sub
```

TABLE P

```
'Private Sub AddItem_Callback(ByRef oTargetWindow As MSHTML.HTMLWindow2, ByRef xmlItem As
MSXML.IXMLDOMNode, Optional ByRef bSetDirty As Boolean = True)
    'Parameters:
    '       oTargetWindow - An object reference to the target window for the item being amplified
    '       xmlItem - An object reference to the xml of the item being amplified
    '       bSetDirty (Optional, Default = True) - Boolean value indicating weather or not to set the dirty flag for the
    amplification
    Private Sub AddItem_Callback(ByRef oTargetWindow As MSHTML.HTMLWindow2, ByRef xmlItem As
    MSXML.IXMLDOMNode, Optional ByRef bSetDirty As Boolean = True)
        'Determine what type of content is being amplified
        Select Case xmlItem.selectSingleNode("@type").Text
            Case "HTMLImg"
                Call AddHTMLImg(xmlItem, oTargetWindow)
            Case "IHTMLTxtRange"
                Call AddIHTMLTxtRange(xmlItem, oTargetWindow)
            Case "HTMLObjectElement"
                Call AddHTMLObjectElement(xmlItem, oTargetWindow)
        End Select
        xmlAmplification.selectSingleNode("amplification/frames") appendChild xmlItem
        oAmplification.Dirty = bSetDirty
        bItemWaiting = False
    End Sub
```

Search (Frame Toolbar)

Referring to FIG. 12, the Frame Toolbar 38 preferably includes a Search 70 icon which allows the User to perform a search for content related to the content item in the frame. The Search icon 70 preferably provides a drop-down menu having a Similar Pages 72 menu item and a Related Content 74 menu item. Upon selection of either the Similar Pages 72 or Related Content 74 search menu items, the software opens a new browser window and queries an Internet search engine (e.g., google.com) with a search command using certain search parameters. The Similar Pages 72 menu item performs a search for web pages related to the domain name of the source of the content item in the frame. The search command for the Similar Pages 72 menu item is, for example:
"http://www.google.com/search?q=related:www.amplifytheweb.com/", where "www.amplifytheweb.com" is the domain name of the source of the content item in the frame.

The Related Content 74 menu item performs a search of the domain of the source of the content item of the frame for items related to the Keywords of the Custom Selection Window. The search command for the Related Content 74 menu item is, for example:

"http://www.google.com/search?q=Keyword1%20Keyword2+site:www.amplifytheweb.com", where "Keyword1" and "Keyword2" are the Keywords entered by the user for the Custom Selection Window.

The result of the search is an independent browser window containing "hits" returned by the search engine, which should be relevant to the selected content or source of the content. As is common, the hits are typically in the form of short descriptions of the search results accompanied by hypertext links, or universal resource locators (i.e., url's), which lead to web pages.

Examples of the code for the Similar Pages 72 and Related Content 74 menu items are set forth below in Tables Q and R, respectively.

TABLE Q

```
Private Sub FrameToolbar_SearchForSimilarPages(oSourceFrame As MSHTML.HTMLFrameElement)
    With xmlAmplification.selectSingleNode("amplification/frames/frame[@id='" + oSourceFrame.id + "']/source")
        LaunchBrowser SEARCH_PAGE + "related:" + .selectSingleNode("host").Text + "/" +
        .selectSingleNode("page").Text
    End With
End Sub
```

TABLE R

```
Private Sub FrameToolbar_SearchThisSite(oSourceFrame As MSHTML.HTMLFrameElement)
      LaunchBrowser SEARCH_PAGE + Keywords + "+site." +
      oAmplification.DOM selectSingleNode("amplification/frames/frame[@id="' +
      oSourceFrame.id + "']/source/host").Text
  End Sub
```

Delete Frame (Frame Toolbar)

The Frame Toolbar 38 also preferably includes a Delete menu item (not shown) that is operable to delete the associated frame from the Custom Selection Window. Preferably, upon the deletion of a frame, the "parent" frame, that is the frame from within the deleted frame was originally created, is resized to occupy the space previously occupied by the parent frame and the deleted frame. In addition, as discussed above the content item within the resized parent frame is resized (i.e., expanded) accordingly.

GoTo This Site, GoTo This Page

Figure 13:
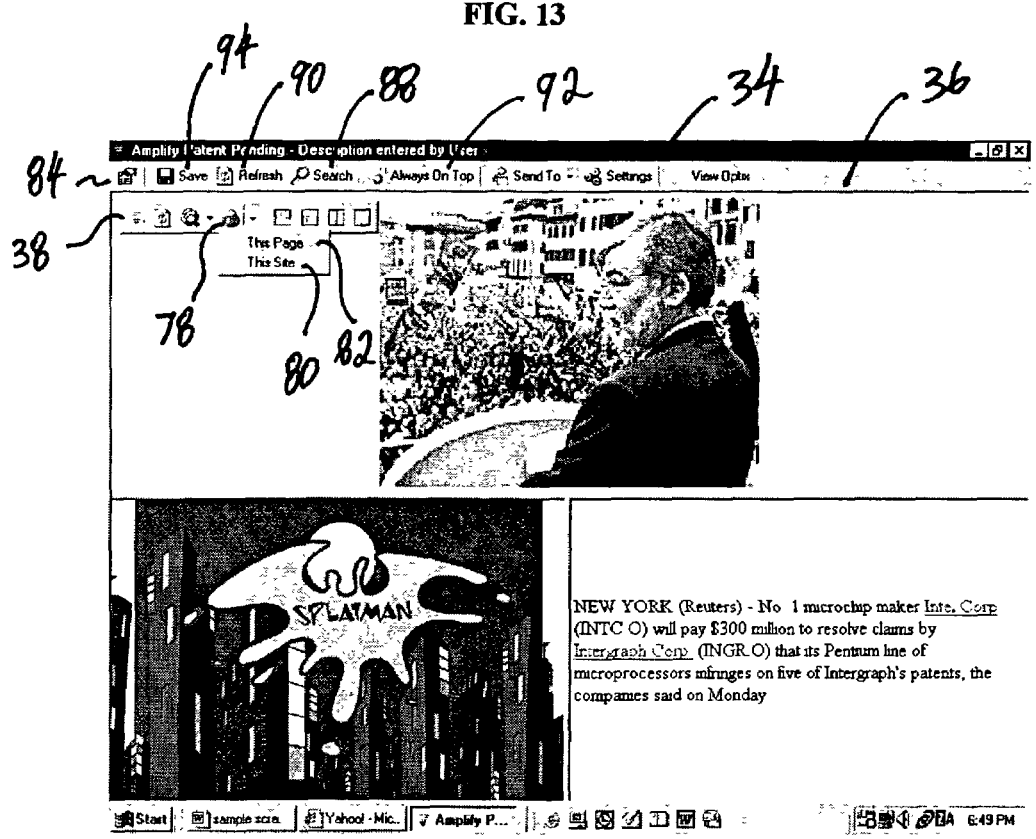

Referring to FIG. 13, the Frame Toolbar 38 also preferably includes a GoTo 78 icon that presents a drop-down menu having a This Site 80 menu item and a This Page 82 menu item. The This Site 80 menu item opens a new browser window that loads the main page of the domain of the content item in the frame. The This Page 82 menu item opens a new browser window that load the page from which the content item of the frame was selected. Thus, the system provides a quick and convenient means to find and view the source of selected content items.

Properties (Window Toolbar)

The Window Toolbar 36 includes a Window Properties 84 icon that displays the Properties Window 28 (see FIG. 5) to allow the User to modify the Description 30 and the Keywords 32.

Search (Window Toolbar)

The Window Toolbar 36 also includes a Search 88 icon that performs a search of the World Wide Web base upon the Keywords 32. An example of the search command invoked by the Search 76 icon of the Window Toolbar 36 is "http://www.google.com/search?q=Keyword1%20Keyword2."

Refresh (Window Toolbar)

The Window Toolbar 36 also preferably includes a Refresh 90 icon that reloads all of the content items of a Custom Selection Window 34 with one click. The example code set forth in Tables N, O & P above will reload all of the content items of a Custom Selection Window.

Always On Top

The Window Toolbar 36 also includes an Always On Top 92 icon, which, when selected, will retain the Custom Selection Window 34 as the top window on the computing device irrespective of whether the User selects another window, such as another program, as the active window. With this function, the User can quickly and conveniently select and focus on a desired content item, such as a streaming video, and ensure that the content item is always visible even if the User is working with another program. As mentioned above, the User can resize and relocate the Custom Selection Window 34 to view other programs, as desired.

Save

A Save 94 icon of the Window Toolbar 36 saves the Custom Selection Window 34 for later use. Preferably a Window Definition of the Custom Selection Window 34 is saved in memory of the computing device of the User (e.g., RAM or on a hard drive) and/or on a remote Server accessible via the Internet or other network. Preferably the content items of a Custom Selection Window are not themselves saved on the computing device of the User or on the Server, but only the Window Definition, which Window Definition contains the particulars of the Custom Selection Window and of the content items therein. Preferably, the Window Definition is in the form of an XML document containing a unique Window Identifier, a frameset and specific information for each frame.

Preferably, upon saving a new Window Definition, the software on the computing device of the User or the Server assigns a unique Window Identifier to the Custom Selection Window which is saved with or otherwise associated with the Window Definition. As discussed below, the Window Identifier is used to recreate the Custom Selection Window at a later time. For non-text content items, the Window Definition does not include the actual content items, but does include information regarding the source and identity of the content item sufficient to access or recreate the content item. Specifically, for non-text content items, the Window Definition preferably includes information identifying the source of the content item, including the domain name, path and file name, and includes identifying information and parameters of any media player or external application (or the like) required to display or play the content item. For text content items, the Window Definition may include the string of text selected by the User, or may include information identifying the source of the text and coordinates specifying the beginning and end points of the text. If entered by the User, the Window Definition also includes the Keywords 30.

The example of the XML code set forth in Table S below is a Window Definition having a video content item, a text content item and an image content item.

TABLE S

```
<amplification>
    <guid>{7DAED7EF-FC90-4CF7-91C6-8886F5BF5C4F}</guid>
    <height>360</height>
    <width>643</width>
    <description>New Amplification</description>
    <keywords></keywords>
    <frameset>
        <frameset cols="50%,50%"><frameset rows="57%,43%"><frame id="fraAmplify3"/><frame
```

TABLE S-continued

```
        id="fraAmplify1"/></frameset><frameset rows="30%,70%"><frame id="fraAmplify2"/><frame
        id="fraAmplify0"/></frameset></frameset></frameset><frames><frame id="fraAmplify0" type="HTMLObjectElement">
            <source>
                <protocol>http:</protocol>
                <host>www.msnbc.com</host>
                <path>/m/mw/</path>
                vw.htm
                <query></query>
            </source>
            <object type="MEDIAPLAYER">
                <class-id>CLSID:22d6f312-b0f6-11d0-94ab-0080c74c7e95</class-id>
                <code-base>http://activex.microsoft.com/activex/controls/mplayer/en/nsmp2inf.cab#Version=6,4,7,1112</code-base>
                <standby>Loading Microsoft Media Player components...</standby>
                <params><param name="AnimationAtStart">False</param><param
                name="AutoRewind">False</param><param name="baseUrl"></param><param
                name="FileName">http://www.msnbc.com/m/mw/s/msnbc/asx.asp?er=http://www.msnbc.com/m/mw/s/msnbc/sorry.asf&b
                =&bu=&vu=&pu=mms://od-msnbc.msnbc com/msnbc/video/promo/100/promo3 asf&cu=mms//od-
                msnbc.msnbc.com/msnbc/video/commercials/100/ad__intertainer__04.asf&akid=472002</param><param
                name="PlayCount">1</param><param name="Rate">1</param></params>
            </object>
        </frame><frame id="fraAmplify1" type="IHTMLTxtRange">
            <source>
                <protocol>http:</protocol>
                <host>www.ncodev.com</host>
                <path>/</path>

<query></query>
            </source>
            <content>
                <![CDATA[<IMG height=10 src="images/dots gif" width=4><B> NCODE</B> is
                the leading software engineering firm to provide <I>integration services</I> and <I>custom
                application development</I> merging legacy technologies and cutting edge
                engineering tools to create the most powerful business applications <BR>]]>
            </content>
        </frame><frame id="fraAmplify2" type="HTMLImg">
            <source>
                <protocol>http.</protocol>
                <host>www.ncodev.com</host>
                <path>/</path>

<query></query>
            </source>
            <image>
                <src>http://www.ncodev.com/images/phrase__2.gif</src>
                <alt></alt>
                <height>54</height>
                <width>232</width>
                <mime-type/>
                <scale>1</scale>
            </image>
        </frame><frame id="fraAmplify3" type="IHTMLTxtRange">
            <source>
                <protocol>http:</protocol>
                <host>www.ncodev.com</host>
                <path>/</path>

<query></query>
            </source>
            <content>
                <![CDATA[<IMG height=10 src="images/dots.gif" width=4> Our entire team is
                committed to transforming our clients' businesses utilizing a range of
                industry leading applications and custom software solutions to meet any
                specific need and business challenge. We mold technology to optimize your
                business processes and ultimately <I>maxmimize your bottom line </I><BR>]]>
            </content>
        </frame></frames>
</amplification>
```

Figure 14:
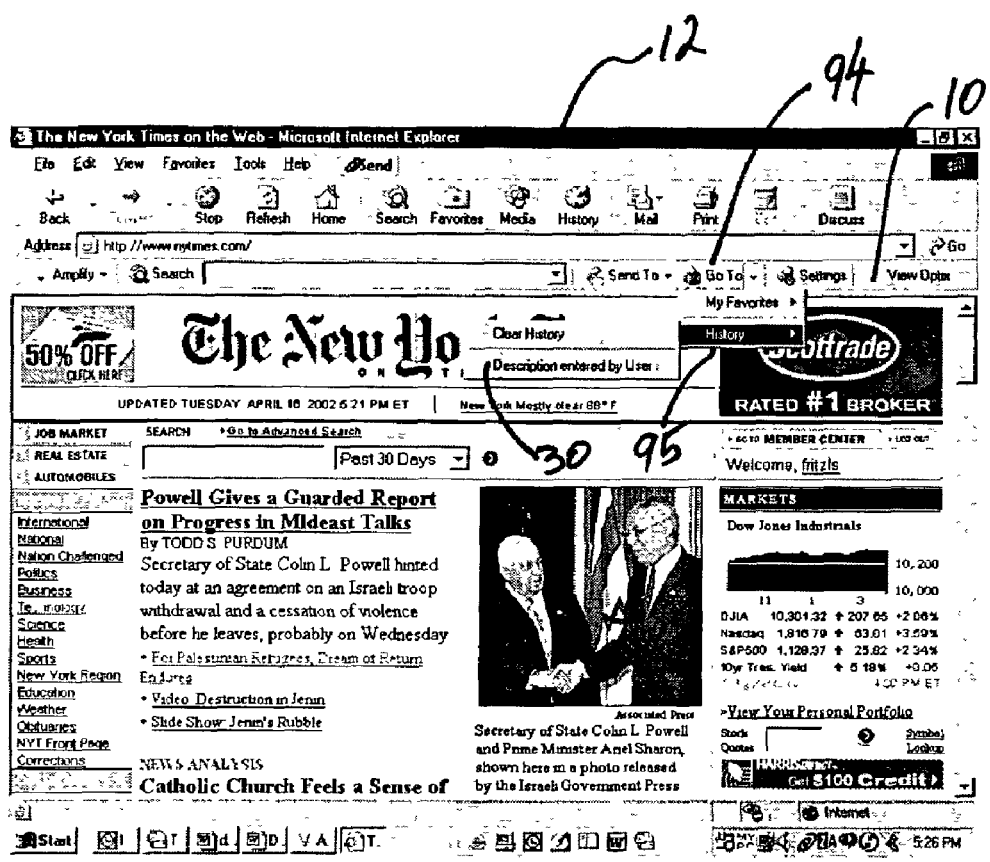
FIG. 14 is an image of the (Go To) History menu item of the Main Toolbar.

Referring to FIG. 14, the Main Toolbar 10 includes a GoTo 94 icon, that presents a History 95 menu item list, that in turn presents a Most Recently Used (MRU) List 96 of Custom Selection Windows, in preferably chronological order of use. Preferably, the windows are identified in the MRU List 96 by their Descriptions 30. The MRU List 96 is preferably limited to a predetermined number of windows, for example the last 20 used, such that the MRU List 96 is a dynamic list providing convenient access to recently used Custom Selection Windows. The User may recreate a Custom Selection Window from the MRU List 96 by clicking on the Description for the window. Upon selection of a Custom Selection Window from the MRU List 96, the software locates and retrieves the Window Definition from the memory device of the computing device or from the Server using the unique Window Identifier, recreates the Custom Selection Window and loads the content items directly from the original source of each item, as recorded in the Window Definition.

Send to Favorites

Figure 15:
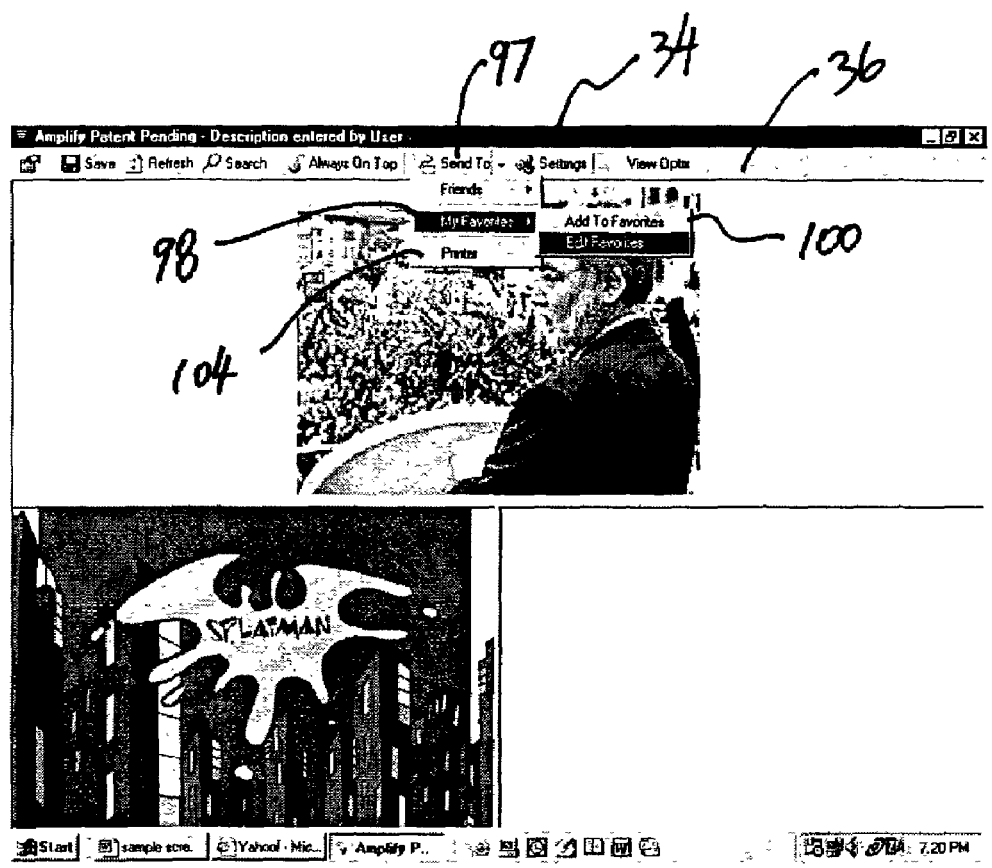
FIG. 15 is an image of the (Send To) Favorites menu item of the Window Toolbar.
Figure 16:
FIG. 16 is an image of the (Go To) Favorites menu item of the Main Toolbar.

Referring to FIGS. 15 & 16, the Window Toolbar 36 includes a Send To 97 icon, that presents a Favorites 98 menu item, that in turn presents an Add to Favorites 100 menu item. The Add to Favorites 100 menu item saves the Custom Selection Window in a Favorites List 102 that is accessible via the GoTo 94 icon of the Main Toolbar 10. As with the MRU List 96, the software stores the Window Definition of each Custom Selection Window in the Favorites List 102 on the computing device and preferably on the Server. Also, as with the MRU List 96, the Custom Selection Windows in the Favorites List 102 are preferably identified by the Description 30. However, in contrast to the MRU List 96, the Favorites List 102 preferably remains the same until the User adds or deletes a Custom Selection Window from the list. Thus, the Custom Selection Windows in the Favorites List 102 will always be available to the User regardless of other windows which the User may have created and saved.

As with the MRU List 96, upon selection of a Custom Selection Window from the Favorites List 102, the software locates and retrieves the Window Definition from the memory device of the computing device of the User or from the Server using the unique Window Identifier, recreates the Custom Selection Window and loads the content items directly from the original source of each item, as recorded in the Window Definition.

Dynamic Favorites List

The Favorites List 102 can be modified, dynamically, as the User navigates (or "surfs") the World Wide Web. In particular, Matching Custom Selection Windows containing content items from the domain of the source currently displayed in the browser application of the User can be highlighted or segregated in the Favorites List 102. For example Matching Custom Selection Windows in the list can be grouped together in a sub-list (not shown) segregated from other Custom Selection Windows in the list. Alternatively, the Matching Custom Selection Windows in the list can be highlighted by limiting the display of the Favorites List 102 to only the Matching Custom Selection Windows, or can be highlighted visually, by color or in some other visual manner. Alternatively, the Favorites List 102 can be presented in an order that highlights the Matching Custom Selection Windows, such as with the Matching Custom Selection Windows at the top of the list. It can be appreciated that any other similar method of dynamically highlighting Matching Custom Selection Windows in the Favorites List 102 is within the scope of the invention.

To dynamically modify the Favorites List 102 according to the domain of a source currently displayed in the browser application, software on the computing device of the User monitors the currently displayed source and compares the domain of the current source to the domains of content items stored in the Window Definitions used to create the Favorites List 102. The software then modifies the Favorites List 102 in one of the above manners, or a similar manner, to highlight Matching Custom Selection Windows.

Send To Printer (Window Toolbar & Frame Toolbar)

Referring to FIG. 15, the Send To icon 97 of the Window Toolbar 36 preferably includes a Printer menu item 104 that sends the Custom Selection Window to a printer available to the computing device of the User. Similarly, the Frame Toolbar 38 also preferably includes a Send to Printer Function (not shown) which allows the user to send the content item of one frame to the printer.

Send to Recipient

Figure 17:
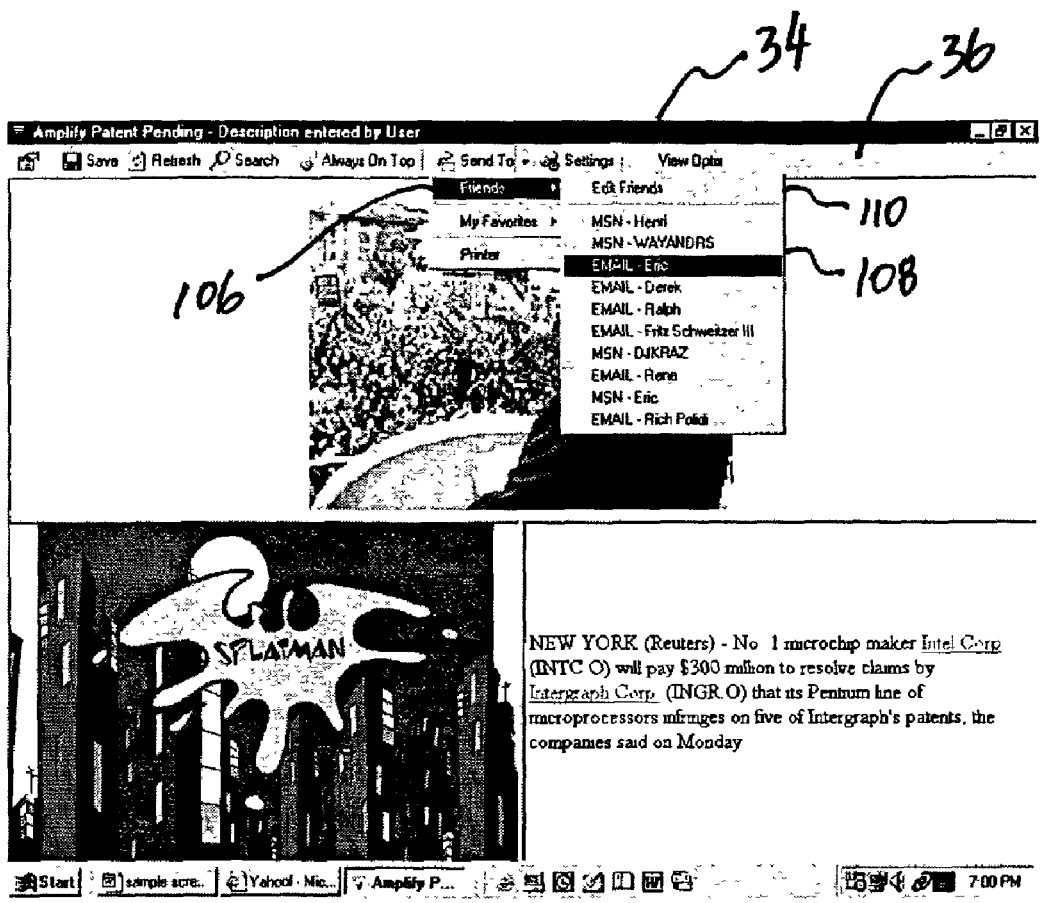
FIG. 17 is an image of the (Send To) Recipients menu item of the Window Toolbar.
Figure 18:
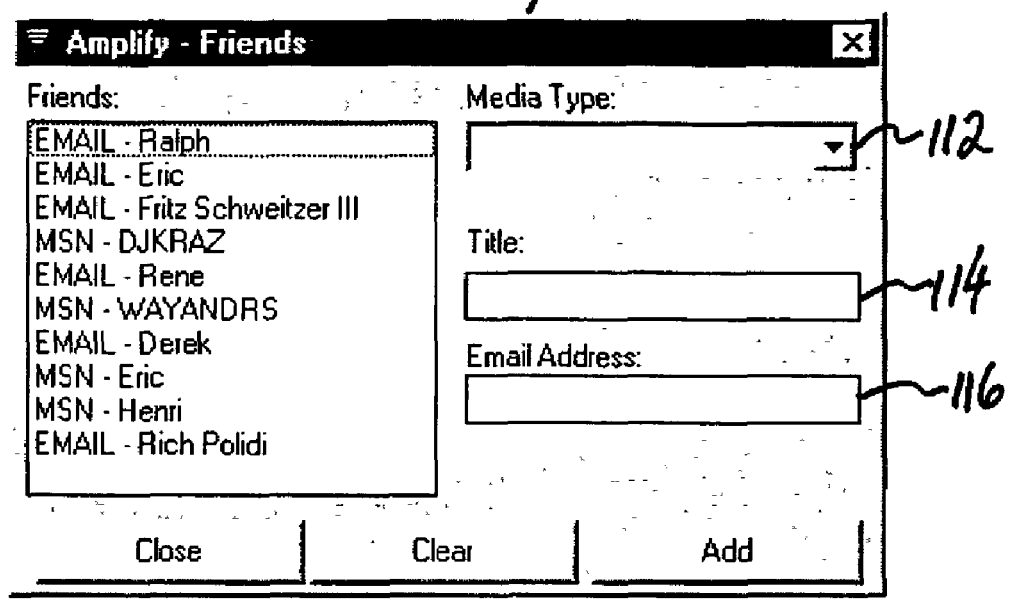
FIG. 18 is an image of the Edit Recipients dialog window.

Referring to FIGS. 17 & 18, the Send To icon 97 of the Window Toolbar 36 also includes a Recipients 106 menu item (shown as "Friends" in the drawings) that presents a List of Recipients 108 to which Custom Selection Windows may be sent by email, instant message or another type of electronic communication method. Preferably, the Recipients 106 menu item provides a means to enter (or modify) the Electronic Address of a Recipient of a Custom Selection Window, such as the Edit Recipients 110 menu item which presents the dialog window 111 of FIG. 18. Preferably, for each Recipient, the User can enter the Electronic Communication Method 112 (e.g., EMAIL), a descriptive Recipient Name 114 and the Electronic Address 116 of the Recipient (e.g., email_address@domain.com).

When a Recipient is chosen from the List of Recipients 108, the software on the computing device of the User sends the Window Definition of the Custom Selection Window (comprising an XML document of the type set forth above in Table S) to the Server. The Window Definition is stored on the Server along with the Window Identifier (which is assigned at that time, if one has not been assigned yet).

After receipt of the Window Definition, the Server sends an electronic message to the Recipient at the Electronic Address of the Recipient via electronic mail, instant messaging program, or other electronic means, as appropriate. The electronic message sent to the Recipient contains a hypertext link, or universal resource locator (url) containing the Window Identifier, which link leads back to the Server.

It may be preferable that the electronic message is sent to the Recipient by the Server. However, the electronic message may also be sent to the Recipient by a communication application on the computing device of the User. In either case, the electronic message includes a link to the Server, which link contains the unique Window Identifier. If the electronic message is sent by the User, both the Server and the computing device of the User must have the unique Window Identifier. (See "Create Link" below).

The presence of the Keywords in the Window Definition provide an important function by allowing the creator of the Custom Selection Window to provide targeted words to search for related content on the web. As a part of the Window Definition, the Keywords are attached to the Custom Selection Window and remain with the Custom Selection Window when it is saved (or sent to the Favorites List), and travel with the Custom Selection Window when the Custom Selection Window is accessed by a Recipient.

It should be noted that the electronic message sent to the Recipient does not contain the content items themselves, but only a link to the Server. As opposed to prior methods of sending entire content items to a recipient, the present invention greatly reduces the time and bandwidth required to send an electronic message to another to share content over a network such as the Internet. Moreover, the present invention overcomes the limitations of electronic communications methods by sending an electronic message containing a link used to re-create the content in a browser application.

Upon receiving the electronic message, the User can recreate the Custom Selection Window by selecting, or clicking on, the hypertext link in the electronic message. When the Recipient selects the link within the electronic message, the computing device of the Recipient activates a browser application that sends a request to the Server, which request contains the unique Window Identifier of the Custom Selection Window. The Server locates the Window Definition of the Custom Selection Window using the Window Identifier embedded within the link and responds with an Initial Recipient Web Page.

The Initial Recipient Web Page has code that attempts to detect whether the Recipient has installed the software required to create Custom Selection Windows. In one embodiment, the Initial Recipient Web Page attempts to detect the presence of the software by attempting to initialize certain components or objects of the software. If the software is detected on the Recipients computing device, then the Initial Web Page passes the Window Identifier to the software which then creates a Custom Selection Window as defined by the Window Definition, which window has the full functionality provided by the software, including the Window and Frame Toolbars.

Recipient Window

Figure 19:
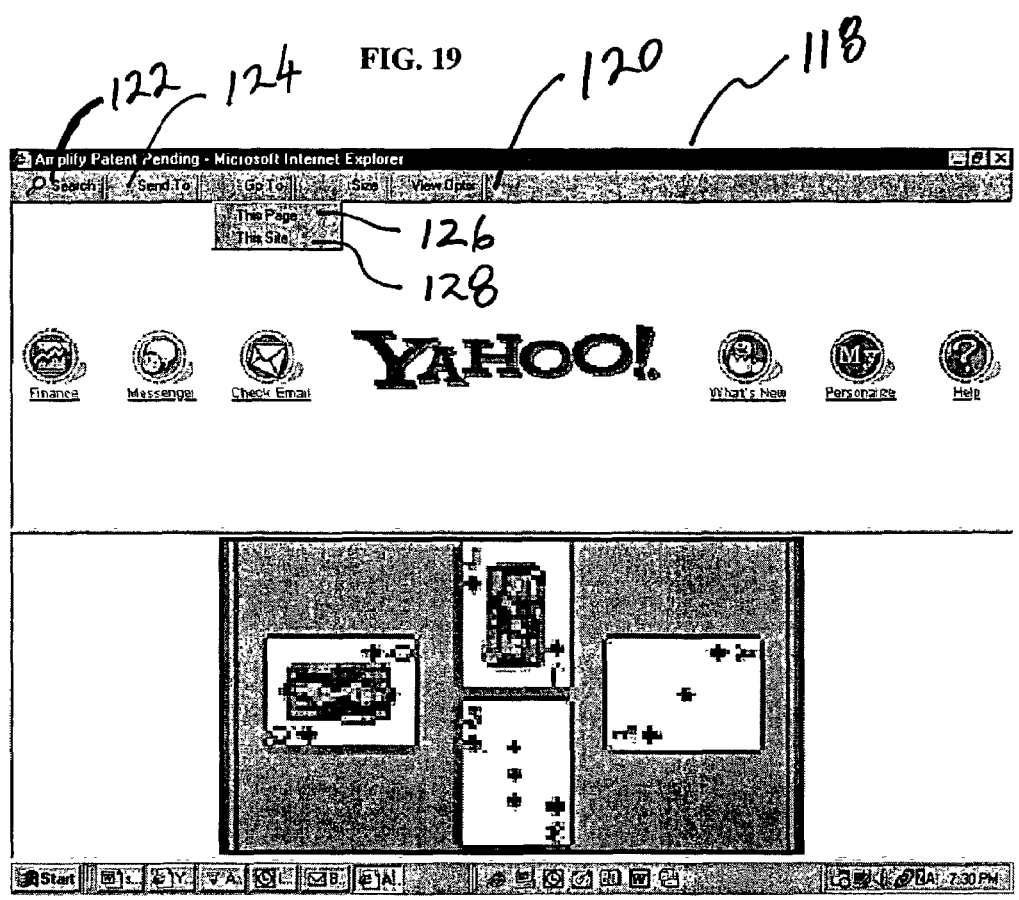
FIG. 19 is an image of the Recipient Window.

Referring to FIG. 19, if the software is not detected, then the Initial Recipient Web Page includes code to open a new browser window, the Recipient Window 118, having dimensions defined in the Window Definition and to retrieve a Recipient Toolbar 120 from the Server and to populate the new window with the Recipient Toolbar 120. Then the browser calls a page to create the frameset for the Recipient Window 118, according to the Window Definition. Each frame within a frameset then calls a page to populate the frame. Preferably a standard browser application can create the Recipient Window 118 without the additional software required to initially create and send the Custom Selection Window. Therefore the User is free to transmit access to the custom selection to any other computing device on the Internet or other network having a browser application.

As with the Custom Selection Window 34, preferably the Recipient Window 118 is configured to load the content items therein via the browser application on the computing device of the Recipient directly from the respective original sources of the content. Thus, by employing the browser application on the computing device of the Recipient to retrieve and load the content items, the system of the present invention avoids the content type and size limitations of electronic messaging systems, as discussed above.

Examples of Server-side code to create the frameset and individual frames for a Recipient Window are set forth in Table T & U, respectively.

TABLE T

```
<!--#INCLUDE FILE="scripts/common.asp"-->
<SCRIPT LANGUAGE=vbscript RUNAT=Server>
Sub FramesetXMLToHTML(oFramesetXML)
    Output "<frameset "
    If Not oFramesetXML.selectSingleNode("@cols") Is Nothing Then
        Output "cols=""" & oFramesetXML.selectSingleNode("@cols").text & """"
    ElseIf Not oFramesetXML.selectSingleNode("@rows") Is Nothing Then
        Output "rows=""" & oFramesetXML.selectSingleNode("@rows").text & """"
    End If
    Output ">"
    For i = 0 To oFramesetXML.childNodes.length - 1
        'Output oFramesetXML.childNodes(i).nodeName & vbCrLf
        Select Case UCase(oFramesetXML.childNodes(i).nodeName)
            Case "FRAME"
                Output "<frame src=""amplification_view_frame.asp?amplification=" &
                    sAmplGUID & "&frame=" & oFramesetXML.childNodes(i).selectSingleNode("@id").text & """ scrolling=""no"">"
            Case "FRAMESET"
                FramesetXMLToHTMLoFramesetXML.childNodes(i)
        End Select
    Next
    Output "</frameset>"
End Sub
</SCRIPT>
<%
Dim sAmplGUID
    sAmplGUID = Request.QueryString("amplification")
If Not Len(sAmplGUID) > 0 Then
    Response.End
End If
Dim lAmplHeight
    lAmplHeight = 0
Dim lAmplWidth
    lAmplWidth = 0
Dim sAmplDescription
    sAmplDescription = " "
Dim sAmplKeywords
    sAmplKeywords = " "
Dim oAmplFramesetXML
Set oAmplFramesetXML = Server.CreateObject("MSXML2.DOMDocument")
Dim oConn, oRS, sSQL
Set oConn = Server.CreateObject("ADODB.Connection")
Set oRS = Server.CreateObject("ADODB.Recordset")
oConn.Open CONN_STRING
sSQL = "amplification_sel_sp @ampl_guid = '" & sAmplGUID & "'"
oRS.Open sSQL, oConn, 3
lAmplHeight = oRS("ampl_height")
lAmplWidth = oRS("ampl_width")
sAmplDescription = oRS("ampl_description")
sAmplKeywords = oRS("ampl_keywords")
```

TABLE T-continued

```
oAmplFramesetXML.loadXML oRS("ampl_frameset")
oRS.Close
oConn.Close
Set oRS = Nothing
Set oConn = Nothing
%>
<html>
<head>
</head>
<% FramesetXMLToHTML(oAmplFramesetXML.documentElement) %>
</html>
<%
Set oAmplFramesetXML = Nothing
%>
```

TABLE U

```
<!--#INCLUDEFILE="scripts/common.asp"-->
    <%
    Dim sAmplGUID
        sAmplGUID = Request.QueryString("amplification")
    Dim sFrameID
        sFrameID = Request.QueryString("frame")
    If Not Len(sAmplGUID) > 0 Or Not Len(sFrameID) > 0 Then
        Response End
    End If
    Dim sFrameType
        sFrameType = ""
    Dim sSourceProtocol
        sSourceProtocol = ""
    Dim sSourceHost
        sSourceHost = ""
    Dim sSourcePath
        sSourcePath = ""
    Dim sSourcePage
        sSourcePage = ""
    Dim sSourceQuery
        sSourceQuery = ""
    Dim oConn, oRS, oRS2, sSQL
    Set oConn = Server.CreateObject("ADODB.Connection")
    Set oRS = Server.CreateObject("ADODB.Recordset")
    Set oRS2 = Server.CreateObject("ADODB.Recordset")
    oConn.Open CONN_STRING
    sSQL = "ampl_frame_sel_sp"_
        & "@fram_ampl_guid = '" & sAmplGUID & "', "_
        & "@fram_id = '" & sFrameID & "'"
    oRS.Open sSQL, oConn, 3
    IfNot oRS.EOF Then
        sFrameType = oRS("fram_type")
        sSourceProtocol = oRS("fram_source_protocol")
        sSourceHost = oRS("fram_source_host")
        sSourcePath = oRS("fram_source_path")
        sSourcePage = oRS("fram_source_page")
        sSourceQuery = oRS("fram_source_query")
    End If
    oRS.Close
    Select Case sFrameType
        Case "HTMLImg"
            sSQL = "ampl_fram_htmlimg_sel_sp"_
                & "@himg_ampl_guid = '" & sAmplGUID & "',"_
                & "@himg_fram_id = '" & sFrameID & "'"
            oRS.Open sSQL, oConn, 3
            If Not oRS EOF Then
    %>
    <html>
    <head>
    <base href="<%= sSourceProtocol & "//" & sSourceHost & sSourcePath %>" target="_blank">
    <script language="JavaScript">
    <!--
    var lOriginalHeight = <%= oRS("himg_height")%>;
    var lOriginalWidth = <%= oRS("himg_width")%>,
    varb ScaleImage = <% If oRS("himg_scale") = 1 Then %>true<% Else %>false<% End If %>;
    function GetImageRatio( ) {
        var dHeightRatio = 0.0;
        var dWidthRatio = 0.0;
        if (document.body.clientHeight <= 20 || document.body.clientWidth <= 20) {
```

TABLE U-continued

```
            dHeightRatio = 1;
            dWidthRatio = 1;
        } else {
            dHeightRatio = lOriginalHeight / (document.body.clientHeight - 4);
            dWidthRatio = lOriginalWidth / (document.body.clientWidth - 4);
        }
        return dWidthRatio > dHeightRatio ? dWidthRatio . dHeightRatio;
}
function ResizeImage( ) {
    if (!bScaleImage) {
        return;
    }
    var dRatio = 0.0;
    dRatio = GetImageRatio( );
    oImage.style.height = Math.round(lOriginalHeight / dRatio);
    oImage.style.width = Math.round(lOriginalWidth / dRatio);
}
function ScaleImage( ) {
    bScaleImage = !bScaleImage;
    if (bScaleImage) {
        HideImageToolbar(true);
        ResizeImage( ),
    } else {
        HideImageToolbar(true);
        oImage.style height = ";
        oImage.style.width = ";
    }
}
//-->
</script>
</head>
<body leftmargin="2" topmargin="2" bottommargin="2" rightmargin="2" onresize="ResizeImage( );">
<table cellpadding="0" cellspacing="0" border="0" height="100%" width="100%">
<tr>
    <td align="center" valign="middle">
        <img id="oImage" src="<%= oRS("himg_src")%>" alt="<%= oRS("himg_alt")%>"
    onload="ResizeImage( );"><br>
    </td>
</tr>
</table>
</body>
</html>
<%
        End If
        oRS.Close
    Case "IHTMLTxtRange"
        sSQL = "ampl_fram_ihtmltxtrange_sel_sp"_
            & "@txrg_ampl_guid = '" & sAmplGUID & "',"_
            & "@txrg_fram_id = '" & sFrameID & "'"
        oRS.Open sSQL, oConn, 3
        If Not oRS.EOF Then
%>
<html>
<head>
<base href="<%= sSourceProtocol & "//" & sSourceHost & sSourcePath %>" target="_blank">
</head>
<body leftmargin="0" topmargin="0" bottommargin="0" rightmargin="0" onload="document.body.scroll='auto';">
<table height="100%" align="center">
<tr>
    <td valign="middle">
        <span><%= oRS("txrg_content")%></span>
    </td>
</tr>
</table>
</body>
</html>
<%
        End If
        oRS.Close
    Case "HTMLObjectElement"
        sSQL = "ampl_fram_htmlobjectelement_sel_sp"_
            & "@oblm_ampl_guid = '" & sAmplGUID & "',"_
            & "@oblm_fram_id = '" & sFrameID & "'"
        oRS Open sSQL, oConn, 3
        If Not oRS.EOF Then
%>
<html>
<head>
<base href="<%= sSourceProtocol & "//" & sSourceHost & sSourcePath %>" target="_blank">
```

TABLE U-continued

```
</head>
<body leftmargin="1" topmargin="1" bottommargin="1" rightmargin="1" bgcolor="#000000">
<%
            Select Case oRS("oblm_type")
                Case "MEDIAPLAYER"
%>
<OBJECT ID="oWindowsMedia" width="100%" height="100%" classid="<%= oRS("oblm_class_id") %>"
        codebase="<%= oRS("oblm_code_base") %>" standby="<%= oRS("oblm_standby") %>"
        onmouseover="this.ShowControls=1;" onmouseout="this.ShowControls=0;">
    <param name="ShowControls" value="0">
    <param name="AutoStart" value="1">
    <param name="AutoSize" value="0">
<%
                    sSQL = "ampl_fram_oblm_params_sel_sp "_
                        & "@parm_ampl_guid = '" & sAmplGUID & "', "

& "@parm_fram_id = '" & sFrameID & "'"
                    oRS2.Open sSQL, oConn, 3
                    Do While Not oRS2.EOF
%>
    <param name="<%= oRS2("parm_name") %>" value="<%= oRS2("parm_value") %>">
<%
                        oRS2.MoveNext
                    Loop
                    oRS2.Close
%>
</OBJECT>
<%
                Case "SHOCKWAVEFLASH"
%>
<OBJECT ID="oShockwaveFlash" height="100%" width="100%" classid="<%= oRS("oblm_class_id") %>"
codebase="<%= oRS("oblm_code_base") %>" standby="<%= oRS("oblm_standby") %>">
<%
                    sSQL = "ampl_fram_oblm_params_sel_sp "_
                        & "@parm_ampl_guid = '" & sAmplGUID & "', "

& "@parm_fram_id = '" & sFrameID & "'"
                    oRS2.Open sSQL, oConn, 3
                    Do While Not oRS2.EOF
%>
    <param name="<%= oRS2("parm_name") %>" value="<%= oRS2("parm_value") %>">
<%
                        oRS2.MoveNext
                    Loop
                    oRS2 Close
%>
</OBJECT>
<%
            End Select
%>
</body>
</html>
<%
        End If
        oRS Close
    End Select
    oConn.Close
    Set oRS2 = Nothing
    Set oRS = Nothing
    Set oConn = Nothing
%>
```

Recipient Toolbar

Referring to FIG. 19, the Recipient Toolbar 120, includes icons to Search 122, Send To Printer 124, Goto This Page 126, and GoTo This Site 128, which initiate functions similar to those functions provided by the Window Toolbar 36, to allow the User to search the World Wide Web for content related to the content in the Recipient Window 118, to print the Recipient Window, or to open another browser window with either the source web page containing the content item or the web site of the domain of the source web page. The Recipient Toolbar also preferably includes a refresh icon (not shown) to reload the window.

Importantly, the Window Definition preferably passes the Keywords to the Recipient Window 118 such that the Keywords follow the custom selection and such that the Recipient can use the Keywords to search for related content. The Search 122 function of the Recipient Toolbar 36 preferably invokes a search command similar to that of the Window Toolbar 36. In particular, the search command may be "http://www.google.com/search?q=Keyword1%20Keyword2." Thus, the creator of the original Custom Selection Window can provide important targeted Keywords for the Recipient to use in performing searches of the World Wide Web for related content items.

Portability

The system of the present invention is preferably compatible with several different computing platforms, such as Microsoft Windows-based and Apple computers, internet appliances, personal digital assistants (PDAs, such as the Palm Pilot, and the like), and other computing platforms, such that custom selections can be shared among various computing devices. Further, certain items of User-defined attribute information, such as the User's MRU List, Favorites and the Recipients List, are preferably portable amongst various computing devices of the User. The software accomplishes this function by transmitting the attribute information to the Server and storing the information along with the unique User Identifier. The User's attribute information is preferably retrieved using the User Identifier when the User first launches the browser. Thus, the system provides a consistent and familiar experience regardless of which computing device the User chooses.

Tracking

The system also provides a highly accurate and flexible means to track content viewed and shared by Users and Recipients. The Server is contacted whenever a custom selection is saved, or sent to or chosen from the Favorites List, when a custom selection is sent to a Recipient using an electronic message, and when a Recipient views a received custom selection. During each of these actions, the custom selection is uniquely identified to the Server by the Window Identifier, which Server contains the Definition of the custom selection. Therefore, in the case of custom selections of a User's Favorites List, the system can track and compile statistics regarding what content items have been selected, what content items are selected in the same window, the number of times a selected item (or group of items) is viewed, and the frequency of viewing. Such statistics can be compiled along with the unique User Identifier to track such information with respect to a particular User, or can be compiled "blind" without regard to a particular User. Importantly, this tracking can be accomplished whether the two images are on the same site or different sites.

For custom selections shared with others, the system can also track and compile statistics on what content items (or groups) are shared with others (and by whom), the number of times a Recipient views a selection, the frequency of viewing, and the chosen method of messaging. As an example, the system can track statistics regarding a User viewing (and likely comparing) images of two products side-by-side in a custom selection, and can track statistics about any sharing of that custom selection. As a further example, the system can track viewing and sharing activities of diverse custom selections containing two or more content items from different network domains (e.g., different web retailers) and can track such activity according to groups or sets of network domain, such as diverse custom selections containing content items from a network domain of web retailer A and from a network domain of web retailer B.

Further, the system does not rely on pre-placed tracking devices, such as "cookies" or "web bugs." The tracking capability of the present invention is based on the content items themselves, in their unaltered format. Moreover, the tracking capability of the system is highly targeted in that it is able to track viewing and transferring access to specific content items, whereas traditional tracking methods such as cookies and web bugs typically only track views of entire web pages. Further, since communication with the Server is required for certain actions, such as saving, saving and retrieving, the tracking capabilities of the system cannot be circumvented. Therefore, the system provides a very reliable, highly targeted and flexible tracking system.

It can be appreciated that the system provides a convenient method for a User to create, view, modify, print and save custom groupings of image and text content items available on web pages and other sources, to search for other related content, and to transfer access to such selections with others, which method is effected in a manner which avoids the limitations of electronic communications methods, which reduces the time and bandwidth required to share the custom groupings via electronic messages, and which provides for highly accurate and flexible tracking of such content viewing and sharing.

Create Link

Figure 20:
FIG. 20 is an image of a Custom Selection Window showing the Create Link Window Toolbar menu item.
Figure 21:
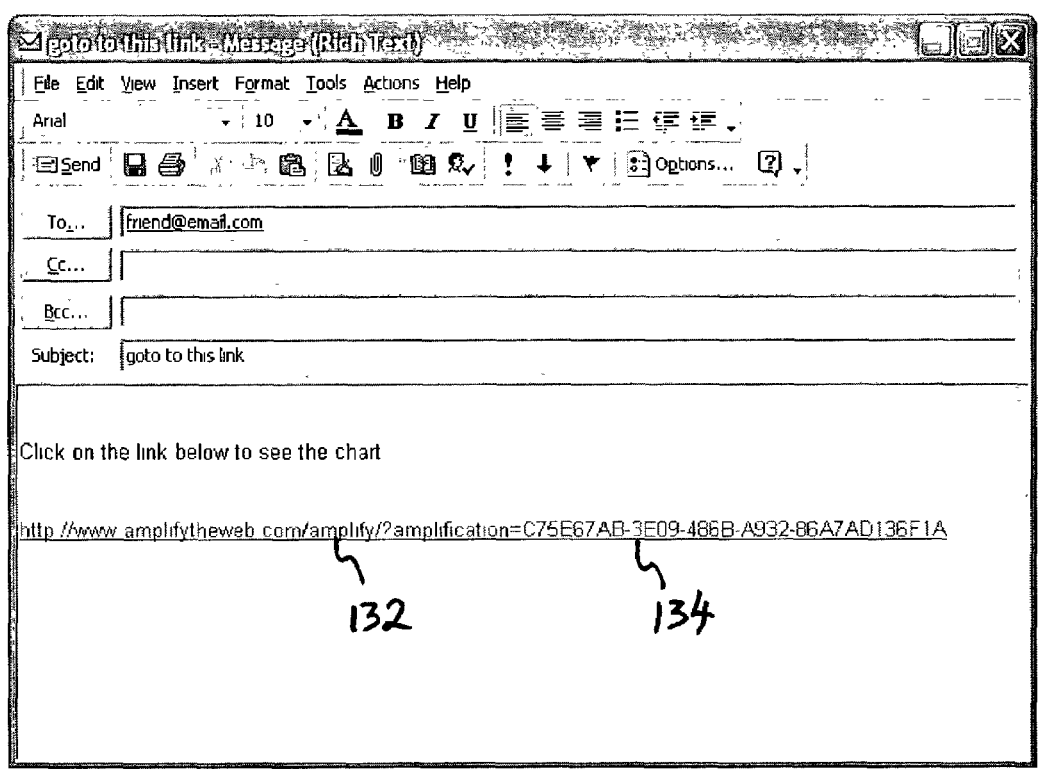
FIG. 21 is an image of an electronic messaging application message containing a Link to a Custom Selection Window.

Referring to FIGS. 20 and 21, the Window Toolbar 36 of the Custom Selection Window 34 preferably includes a Link Creation 130 icon (depicted in the drawing as "Copy Link") which, when selected, loads or copies a hypertext Link 132 for the associated Custom Selection Window into the "Clipboard" memory or other similar user-accessible memory of the computing device. As discussed above, the hypertext Link 132 for the Custom Selection Window is preferably in the form of a complete uniform resource locator (url) leading to the Server and includes a unique Window Identifier 134 assigned to the particular Custom Selection Window. In the example depicted in FIG. 21, the Window Identifier is located in a query string, specifically after string "?amplification=", however the Window Identifier may be located in another portion of the query string.

Since the hypertext Link 132 is loaded or copied to the Clipboard memory, the User can easily and conveniently "paste" the Link 132 in an otherwise familiar manner into other documents or windows, such as the body of an electronic mail message, a word processing document, an instant message or any other location where information present in Clipboard memory may be pasted. Then that document or message may be transmitted to others (or may be saved) for sharing access to the Custom Selection Window, or for other purposes.

An example of a portion of code suitable for this feature is as follows:

Clipboard.SetText AMPLIFY_URL_VIEW+Mid$(oAmplification GUID, >2,_Len(oAmplification.GUID)-2)

The Link Creation 130 icon is preferably operable to initiate the assignment of the Window Identifier. As discussed above, the Window Identifier may also be assigned by the computing device of the User and/or by the Server when the Custom Selection Window is saved for the first time.

System Area Icon

Figure 22:
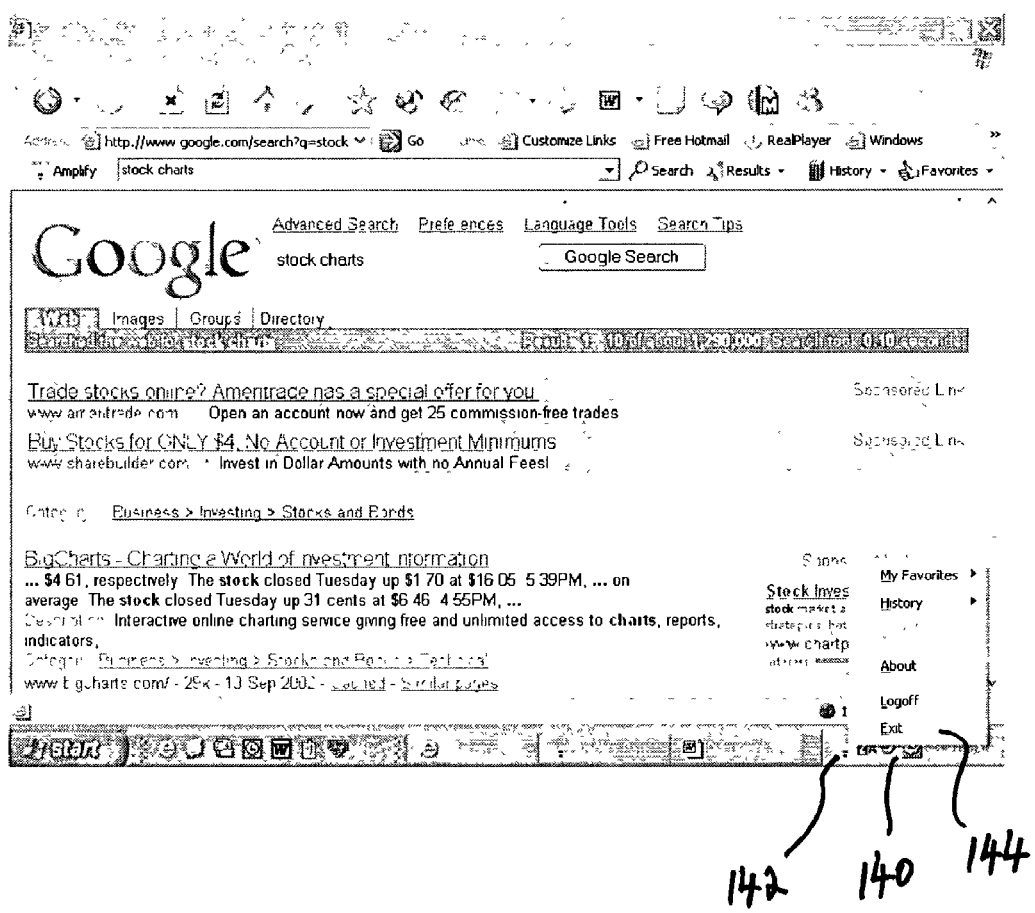
FIG. 22 is an image of a System Area Icon and System Area Menu.

Referring to FIG. 22, the software preferably adds a System Area Icon 140 in a System Area 142 of the user interface (e.g., the "System Tray" in Windows™). The System Area Icon 140 is preferably not dependent upon the presence of a running instance of the browser application and is preferably always present and active. The System Area Icon 140, when selected, provides a System Area Menu 144 providing access to the MRU List (i.e., History) and/or the Friends List. Thus, the System Area Icon 140 provides quick and easy access to these features at all times, irrespective of whether a browser application is running on the computing device of the User at the time.

A portion of code suitable to implement this feature of the invention is as follows:

Shell_NotifyIcon NIM_ADD, nidSysTray

Search Results List

Figure 23:
FIG. 23 is an image of a Return To Search Results icon and a condensed Search Results List.

Referring to FIG. 23, another feature of the software provides a Search Results List 146 that displays results of the last search of the Internet or other network sources, for example the results from an Internet search engine. The User may navigate to the results from the Search Results List 146 until the results are overwritten by a successive search, or until the browser from which the search was conducted is closed.

A search of the Internet (or of an intranet or other network or local source) preformed with a search engine or similar means often produces a result that is presented in a predetermined, consistent format on a Search Results Page 147 containing a list of result items or "hits" 148. The individual result items are usually spaced from one another on the page such that each hit is visually distinguishable from the others. The layout of the web page containing the result items is defined by a formatting language, such as Hypertext Markup Language (HTML).

Each result item on a Search Results Page 147 typically includes a Descriptive Hypertext Link 150 comprised of a descriptive text portion 152 displayed in plain English and an underlying raw url (which is hidden from the User). A result item may also include a Raw Hypertext Link 154 comprised of a displayed raw url. There may also be further descriptive text 156 associated with the result item which may be inactive.

As is known, the User can access a resource associated with the result item listed on the Search Results Page 147 by selecting (i.e., clicking on) one of the hypertext links. With prior systems and methods, to access another result item on the Search Results Page 147, the User must then return to the Search Results Page 147 using the "Back" command of the browser. However, this may require several (or many) steps, especially if the User has navigated far from the original Search Results Page 147. Further, in certain situations, the User may be unable to return to the original Search Results Page 147 and may have to perform another search.

The Main Toolbar 10 preferably contains a Return to Search Results icon 157 that reloads the last Search Results Page 147 and a Search Results List icon 158 that produces the condensed Search Results List 146 containing a predetermined number (for example the first 10) of Results Items 160 obtained from a search. The text of the Results Items 160 is preferably obtained only from the displayed descriptive text portion 152 of the associated Descriptive Hypertext Link 150 of the particular search result item. To limit the amount of space required for the Search Results List 146, the number of characters displayed for each Results Item 160 may be limited to a predetermined amount, for example 10 characters. As shown, an ellipsis or other visual indicator can be added to the Results Item 160 when the displayed descriptive text portion 152 is greater than the predetermined number of characters.

The content of the Search Results List 146 preferably remains unchanged until another search is conducted. Thus, after performing a search and navigating to one of the results, the User need not return to the Search Results Page 147 to navigate to other results on the Search Results List 146. Instead, the User may access the Search Results List 146 from the Main Toolbar 10 and select the desired Results Item 160. Alternatively, the User can reload the Search Results Page 147 by selecting the Return To Search Results Page icon 157. It can be appreciated that this provides a significant advantage both in the amount of time required to access different Results Items 154 and the guaranteed ability to select different Results Items 154.

In the formatting code of a typical Search Results Page 147 (i.e., HTML), the results items are separated by and/or enclosed within predetermined anchors or tags. In the example provided in Table V below, the results items are preceded by the paragraph tag "<p>" which is followed by a hypertext reference tag, namely "<a href=". The hypertext reference tag defines the Descriptive Hypertext Link 150, including the descriptive text portion 152 and the underlying raw url. In the example of Table V, the underlying raw url of the first result item is <http://www.bigcharts.com> and the descriptive text portion 152 is "BigCharts—Charting a World of Investment Information".

TABLE V

<
<p><a href=http://www.bigcharts.com/>BigCharts - Charting a World of Investment
Information</a><br><font size=-1> <b>...</b> edged up 0.2 percent. Volume amounted to 1.77 billion
on the NYSE and<br>
to 1.78 billion on the Nasdaq <b>Stock</b> Market. Market breadth was <b>...</b>
<br><span class=f><font size=-1>Description.</font></span> Interactive online charting service giving
free and unlimited access to <b>charts</b>, reports, indicators,. <br><span class=f>Category: </span><a
class=fl
href=http://directory.google.com/Top/Business/Investing/Stocks_and_Bonds/Technical/?il=1>Business&
nbsp;> Investing > Stocks and Bonds > Technical
</a><br><font color=#008000>www.bigcharts.com/ - 29k - Sep 22, 2002 - </font><a class=fl
href=http://216.239 39 100/search?q=cache:X0rgDaCZlpsC:www.bigcharts.com/+stock+charts&hl=en&
ie=UTF-8>Cached</a> - <a class=fl href=/search?hl=en&lr=&ie=UTF-8&oe=UTF-
8&q=related www.bigcharts.com/>Similar pages</a></font>
<p><a href=http://www.redherring.com/>Red Herring Online</a><br><font size=-1><span
class=f><font size=-1>Description:</font></span> On-line version of professional magazine. News and
reviews focusing on technology, analysis, and research ..<br><span class=f>Category: </span><a
class=fl href=http://directory.google.com/Top/Computers/Software/Business/E-Coramerce/Business-to-
Business/On-Line-
Resources/?il=1>Computers > Software >, , .  ,>, ,E-
Commerce ,>, ,Business-to-Business > ,On-Line-Resources</a><br><font
color=#008000>www.redherring.com/ - 43k - Sep 22, 2002 - </font><a class=fl
href=http://216 239.39.100/search?q=cache:zvXzurh2cc8C www.redherring.com/+stock+charts&hl=en&
ie=UTF-8>Cached</a> - <a class=fl href=/search?hl=en&lr=&ie=UTF-8&oe=UTF-
8&q=related:www.redherring.com/>Similar pages</a></font>
>

In the example provided in Table W below, the results items are separated by the anchor or tag "<span class=i>" which is followed by a hypertext reference tag, namely "<a onclick=", that defines the Descriptive Hypertext Link 150, including the descriptive text portion and the underlying raw url. In the example of Table W, the underlying raw url of the first result item is <http://stocks.tradingcharts.com> and the descriptive text portion 152 is "Free stock price charts quotes".

TABLE W

```
<
<span class=i><a onclick="Co('1')"
href="/r?ck_sm=384408da&ref=20080&uid=37acedd422c60529&r=http%3A%2F%2Fstocks.
tradingcharts.com%2F" onMouseOver="status='http://stocks.tradingcharts.com/'; return
true;">Free <b>stock</b> price <b>charts</b> quotes</a>   <span id="ct1"
class=y></span>
</span><br>
Free <b>stock</b> quotes and <b>charts</b> for nearly every North American exchange. ... Free
<b>stock</b> price <b>charts</b> <b>stock</b> price quotes The source for free <b>stock</b>
market price quotations <b>charts</b>. We chart thousands of stocks ...<br>
<span class=x>
stocks.tradingcharts.com/
• <a
href="/sites/search/web?pg=q&stype=stext&q=like.http://stocks.tradingcharts.com/&dq=stock+c
harts" class=x>Related pages</a> 
•, <a
href="http://jump.altavista.com/trans.go?urltext=http://stocks.tradingcharts.com/&language=en"
class=x>Translate</a>
<br><a
href="http://jump.altavista.com/more_from_sitego?q&stype=stext&Translate=on&sc=off&q=st
ock+charts&si=16afb37d31cb3a91&k1=XX" class=x>More pages from
stocks tradingcharts.com</a> 
</span>
<br><br clear=left>
<blockquote>
<span class=i><a
onclick="Co('2')"
href="/r?ck_sm=7a46c44c&ref=20080&uid=6ce68a7a4da1a1d2&r=http%3A%2F%2Fwww.trad
ingcharts.com%2F" onMouseOver="status='http //www.tradingcharts.com/', return
true;"><b>Charts</b> Quotes From TradingCharts- <b>stock</b> market commodity futures
market quotations plus stocks commodities price <b>charts</b></a>   <span id="ct2"
class=y></span>
</span><br>
The source for free quotes and <b>charts</b> - over 30,000 <b>stock</b> market and
commodity futures ... Free <b>charts</b> quotations <b>stock</b> market commodity futures
quotes price <b>charts</b> The source for free quotes <b>charts</b> ...<br>
<span class=x>
www.tradingcharts.com/
•, <a
href="/sites/search/web?pg=q&stype=stext&q=like:http://www.tradingcharts.com/&dq=stock+ch
arts" class=x>Related pages</a> 
•, <a
href="http://jump.altavista.com/trans.go?urltext=http://www.tradingcharts.com/&language=en"
class=x>Translate</a>
<br><a
href="http://jump.altavista.com/more_from_site.go?q&stype=stext&Translate=on&sc=off&q=st
ock+charts&si=16afb37d31cb3a91&k1=XX" class=x>More pages from
www.tradingcharts.com</a> 
</span>
<br><br clear=left>
</blockquote>
<span class=i><a
onclick="Co('3')"
href="/r?ck_sm=8e6759d8&ref=20080&uid=694a35a5259ee060&r=http%3A%2F%2Fbigcharts.
marketwatch.com%2F" onMouseOver="status='http://bigcharts.marketwatch.com/', return
true;">BigCharts - Charting a World of Investment Information</a>   <span id="ct3"
class=y></span>
</span><br>
Symbol/Keywords: Find Symbol New! --> major market indexes Sponsored By:<br>
<span class=x>
bigcharts.marketwatch.com/
•<a
href="/sites/search/web?pg=q&stype=stext&q=like http://bigcharts.marketwatch.com/&dq=stock
+charts" class=x>Related pages</a> ,
•<a
href="http://jump.altavista.com/trans go?urltext=http //bigcharts.marketwatch.com/&language=e
```

TABLE W-continued n" class=x>Translate</a>
<br><a
href="http://jump.altavista.com/more_from_site.go?q&stype=stext&Translate=on&sc=off&q=st
ock+charts&si=22a4278b83111819&k1=XX" class=x>More pages from
bigcharts.marketwatch.com</a> 
</span>
>

To create the Search Results List 146, the software analyzes each page or resource displayed within the browser application or other similar application of the computing device of the User, preferably when the page has completed loading, and compares the current page to a predetermined set of known search result pages. In particular, the software compares the first portion of the location of the current page or resource (i.e., the url), such as the domain and certain further arguments or strings, to a predetermined list of resource locations of known search results sources. For example, the first portion of a url for a search result page returned by the "google.com" Internet search engine is known to be <http://www.google.com/search?> and a similar first portion of the url for the "Alta Vista" search engine is <http://www.altavista.com/sites/search/web?>.

If the software determines the current page to be one of a known type of search results source, the software scans through the source code of the page to determine the results items displayed on the page. It can be appreciated that upon detection of a search result page, the format of that page is also determined. Therefore, the scan of the source code is conducted according to the known format of the detected search results page.

The software scans the source code of a detected search result page for an indicator of a results item such as a predetermined combination of tags. Specifically, the software scans the source code for the first occurrence of a predetermined separator tag, such as a text formatting tag, where the next tag (i.e., the first child tag) is a resource reference tag, such as a hypertext reference tag. For example, for the source code set forth in Table V, the software scans the code for the first instance of the "<p>" tag where the next tag is the "<a href=" tag. For the source code set forth in Table W, the software scans for the first instance of the "<span class=>" tag where the next tag is the "<a onclick=" tag.

Upon detection of an occurrence of the predetermined combination of tags, the software parses the resource information of the associated resource reference tag to determine the descriptive text portion and the underlying resource location (url) for the resource. The descriptive text portion of the resource reference tag is added to the Search Results List 146 and the resource location is stored in memory of the computing device and associated with the item added to the Search Results List 146. This process is repeated until the Search Results List 146 is filled with a predetermined number of results items, for example 10, or until the software scans through the entire page.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed:

1. A system for creating and displaying a custom selection of content items from web pages, comprising:
a first user computing device having a network browser application and a user input pointing device;
said browser application being operable to display, in a first browser window, a first source web page having a first plurality of displayed content items;
said browser application being operable for selection of a first selected content item from among said first plurality of displayed content items, said first selected content item being selectable exclusive of non-selected ones of said first plurality of displayed content items, and said first selected content item being identified in response to input from a user through said pointing device;
said first selected content item being file-based and being defined in said first source web page by a relative network location;
said browser application being operable to load said first selected content item in a custom browser window, exclusive of said non-selected ones of said first plurality of displayed content items;
said browser application being operable to obtain a complete network location of said first content item and custom browser window including said complete network location of said first selected content item;
said browser application being operable to display, in a second browser window, a second source web page having a second plurality of displayed content items;
said browser application being operable for selection of a second selected content item from among said second plurality of displayed content items, said second selected content item being selectable exclusive of non-selected ones of said second plurality of displayed content items, and said second selected content item being identified in response to input from a user through said pointing device;
said second selected content item being file-based and being defined in said second source web page by a relative network location;
said browser application being operable to load said second selected content item in said custom browser window, exclusive of said non-selected ones of said first and second pluralities of displayed content items;
said browser application being operable to obtain a complete network location of said second content item and said custom browser window including said complete network location of said second selected content item;
said browser application is operable to save, on a computer storage device, a definition of said custom browser window displaying said first and second selected content items, said definition including said complete network locations of said first and second content items;

said browser application is operable to retrieve said definition from said computer storage device and to re-create said custom browser window including said first and second content items, said first and second content items being loaded from said complete network locations thereof upon re-creation of said custom browser window;

said computer storage device is a server connected to said first user computing device over a computer network;

said definition is assigned a unique identifier;

said browser application is operable to retrieve said definition from said server over said computer network using said unique identifier;

said system includes a second user computing device connected to said server over said computer network;

said server or said first user computing device is operable to send a hypertext link including said unique identifier to said second user computing device;

said second computing device is operable to receive said hypertext link and is operable to retrieve said definition from said server using said hypertext link;

said system includes means to detect a presence of predetermined software on said second user computing device operable to permit modification and saving of said custom browser window;

if said predetermined software is present on said second user computing device, said server is operable to deliver a first definition defining a first version of said custom browser window to said second computing device;

said first version of said custom browser windows including controls operable to modify said first custom browser window and to save a new definition of said first custom browser window;

if said predetermined software is absent from said second user computing device, said server is operable to deliver a second definition defining a second version of said custom browser window to said second computing device; and said second version of said custom browser window not including controls to modify said second custom browser window or to save a new definition of said second custom browser window.

2. A system for creating and displaying a custom selection of content items from web pages, comprising:

a first user computing device having a network browser application and a user input pointing device;

said browser application being operable to display, in a first browser window, a first source web page having a first plurality of displayed content items;

said browser application being operable for selection of a first selected content item from among said first plurality of displayed content items, said first selected content item being selectable exclusive of non-selected ones of said first plurality of displayed content items, and said first selected content item being identified in response to input from a user through said pointing device;

said first selected content item being file-based and being defined in said first source web page by a relative network location;

said browser application being operable to load said first selected content item in a custom browser window, exclusive of said non-selected ones of said first plurality of displayed content items;

said browser application being operable to obtain a complete network location of said first content item and said custom browser window including said complete network location of said first selected content item;

said browser application being operable to display, in a second browser window, a second source web page having a second plurality of displayed content items;

said browser application being operable for selection of a second selected content item from among said second plurality of displayed content items, said second selected content item being selectable exclusive of non-selected ones of said second plurality of displayed content items, and said second selected content item being identified in response to input from a user through said pointing device;

said second selected content item being file-based and being defined in said second source web page by a relative network location;

said browser application being operable to load said second selected content item in said custom browser window, exclusive of said non-selected ones of said first and second pluralities of displayed content items;

said browser application being operable to obtain a complete network location of said second content item and said custom browser window including said complete network location of said second selected content item;

said first selected content item is loaded in a first frame of said custom browser window and said second selected content item is loaded in a second frame of said custom browser window;

said first frame of said custom browser window includes a base reference of said first selected content item, and said first frame including said relative network location of said first selected content item;

said second frame of said custom browser window includes a base reference of said second selected content item, and said second frame including said relative network location of said second selected content item;

said first frame includes a frame division icon operable to divide said first frame into first and second sub-frames upon a click action thereon by said user through said pointing device; and said first sub-frame including a content of said one frame and said second sub-frame being an empty frame.

3. A system for creating and displaying a custom selection of content items from web pages, as in claim 2, wherein:

said first frame includes first, second, third and fourth frame division icons and a frame delete icon, said icons being operable upon a click action thereon by said user through said pointing device;

said first frame division icon is operable to locate said empty frame to a right of said first sub-frame;

said second frame division icon is operable to locate said empty frame to a left of said first sub-frame;

said third frame division icon is operable to locate said empty frame above said first sub-frame frame;

said fourth frame division icon is operable to locate said empty frame below said first sub-frame; and said frame delete icon is operable to delete said first frame.

4. A system for creating and displaying a custom selection of content items from web pages, as in claim 3, wherein:

said first, second, third and fourth frame division icons and said frame delete icon appear within said first frame when said pointing device is directed over said first frame and disappear when said pointing is directed outside said first frame.

5. A system for creating and displaying a custom selection of content items from web pages, comprising:
- a first user computing device having a network browser application and a user input pointing device;
- said browser application being operable to display, in a first browser window, a first source web page having a first plurality of displayed content items;
- said browser application being operable for selection of a first selected content item from among said first plurality of displayed content items, said first selected content item being selectable exclusive of non-selected ones of said first plurality of displayed content items, and said first selected content item being identified in response to input from a user through said pointing device;
- said first selected content item being file-based and being defined in said first source web page by a relative network location;
- said browser application being operable to load said first selected content item in a custom browser window, exclusive of said non-selected ones of said first plurality of displayed content items;
- said browser application being operable to obtain a complete network location of said first content item and custom browser window including said complete network location of said first selected content item;
- said browser application being operable to display, in a second browser window, a second source web page having a second plurality of displayed content items;
- said browser application being operable for selection of a second selected content item from among said second plurality of displayed content items, said second selected content item being selectable exclusive of non-selected ones of said second plurality of displayed content items, and said second selected content item being identified in response to input from a user through said pointing device;
- said second selected content item being file-based and being defined in said second source web page by a relative network location;
- said browser application being operable to load said second selected content item in said custom browser window, exclusive of said non-selected ones of said first and second pluralities of displayed content items;
- said browser application being operable to obtain a complete network location of said second content item and said custom browser window including said complete network location of said second selected content item;
- said custom browser window includes a first source-page-retrieval icon operable to load, in a third browser page, said first source web page.

6. A system for creating and displaying a custom selection of content items from web pages, as in claim 5, wherein:
- said custom browser window includes a second source-page-retrieval icon operable to load, in a fourth web page, said second source web page.

7. A system for creating and displaying a custom selection of content items from web pages, comprising:
- a first user computing device having a network browser application and a user input pointing device;
- said browser application being operable to display, in a first browser window, a first source web page having a first plurality of displayed content items;
- said browser application being operable for selection of a first selected content item from among said first plurality of displayed content items, said first selected content item being selectable exclusive of non-selected ones of said first plurality of displayed content items, and said first selected content item being identified in response to input from a user through said pointing device;
- said first selected content item being file-based and being defined in said first source web page by a relative network location;
- said browser application being operable to load said first selected content item in a custom browser window, exclusive of said non-selected ones of said first plurality of displayed content items;
- said browser application being operable to obtain a complete network location of said first content item and custom browser window including said complete network location of said first selected content item;
- said browser application being operable to display, in a second browser window, a second source web page having a second plurality of displayed content items;
- said browser application being operable for selection of a second selected content item from among said second plurality of displayed content items, said second selected content item being selectable exclusive of non-selected ones of said second plurality of displayed content items, and said second selected content item being identified in response to input from a user through said pointing device;
- said second selected content item being file-based and being defined in said second source web page by a relative network location;
- said browser application being operable to load said second selected content item in said custom browser window, exclusive of said non-selected ones of said first and second pluralities of displayed content items;
- said browser application being operable to obtain a complete network location of said second content item and said custom browser window including said complete network location of said second selected content item;
- said custom browser window includes a first home-page-retrieval icon operable to load, in a third browser window, a home page of a second-level domain of said first source web page.

8. A system for creating and displaying a custom selection of content items from web pages, as in claim 7, wherein:
- said custom browser window includes a second home-page-retrieval icon operable to load, in a fourth browser window, a home page of a second-level domain of said second source web page.

9. A system for creating and displaying a custom selection of content items from web pages, comprising:
- a first user computing device having a network browser application and a user input pointing device;
- said browser application being operable to display, in a first browser window, a first source web page having a first plurality of displayed content items;
- said browser application being operable for selection of a first selected content item from among said first plurality of displayed content items, said first selected content item being selectable exclusive of non-selected ones of said first plurality of displayed content items, and said first selected content item being identified in response to input from a user through said pointing device;
- said first selected content item being file-based and being defined in said first source web page by a relative network location;
- said browser application being operable to load said first selected content item in a custom browser window, exclusive of said non-selected ones of said first plurality of displayed content items;
said browser application being operable to obtain a complete network location of said first content item and custom browser window including said complete network location of said first selected content item;
said browser application being operable to display, in a second browser window, a second source web page having a second plurality of displayed content items;
said browser application being operable for selection of a second selected content item from among said second plurality of displayed content items, said second selected content item being selectable exclusive of non-selected ones of said second plurality of displayed content items, and said second selected content item being identified in response to input from a user through said pointing device;
said second selected content item being file-based and being defined in said second source web page by a relative network location;
said browser application being operable to load said second selected content item in said custom browser window, exclusive of said non-selected ones of said first and second pluralities of displayed content items;
said browser application being operable to obtain a complete network location of said second content item and said custom browser window including said complete network location of said second selected content item;
said browser application is operable to analyze said first and second pluralities of displayed content items of said first and second source web pages; and
said browser application is operable to display a list of selectable ones of said first and second pluralities of displayed content items.

10. A system for creating and displaying a custom selection of content items from web pages, comprising:
a first user computing device having a network browser application and a user input pointing device;
said browser application being operable to display, in a first browser window, a first source web page having a first plurality of displayed content items;
said browser application being operable for selection of a first selected content item from among said first plurality of displayed content items, said first selected content item being selectable exclusive of non-selected ones of said first plurality of displayed content items, and said first selected content item being identified in response to input from a user through said pointing device;
said first selected content item being file-based and being defined in said first source web page by a relative network location;
said browser application being operable to load said first selected content item in a custom browser window, exclusive of said non-selected ones of said first plurality of displayed content items;
said browser application being operable to obtain a complete network location of said first content item and custom browser window including said complete network location of said first selected content item;
said browser application being operable to display, in a second browser window, a second source web page having a second plurality of displayed content items;
said browser application being operable for selection of a second selected content item from among said second plurality of displayed content items, said second selected content item being selectable exclusive of non-selected ones of said second plurality of displayed content items, and said second selected content item being identified in response to input from a user through said pointing device;
said second selected content item being file-based and being defined in said second source web page by a relative network location;
said browser application being operable to load said second selected content item in said custom browser window, exclusive of said non-selected ones of said first and second pluralities of displayed content items;
said browser application being operable to obtain a complete network location of said second content item and said custom browser window including said complete network location of said second selected content item;
one of said first plurality of displayed content items is a rich media content item; and
said first selected content item is said rich media content item.

11. A system for creating and displaying a custom selection of content items from web pages, as in claim 10, wherein:
said browser application displays a temporary selection icon when said pointing device is directed over said rich media content item in said first browser window; and
said browser application is operable to select said rich media content item upon a click event of said temporary selection icon by said pointing device.

12. A system for creating and displaying a custom selection of content items from web pages, as in claim 11, wherein said temporary selection icon is displayed over said rich media content item when said pointing device is directed over said rich media content item.

13. A system for creating and displaying a custom selection of content items from web pages, comprising:
a first user computing device having a network browser application and a user input pointing device;
said browser application being operable to display, in a first browser window, a first source web page having a first plurality of displayed content items;
said browser application being operable for selection of a first selected content item from among said first plurality of displayed content items, said first selected content item being selectable exclusive of non-selected ones of said first plurality of displayed content items, and said first selected content item being identified in response to input from a user through said pointing device;
said first selected content item being file-based and being defined in said first source web page by a relative network location;
said browser application being operable to load said first selected content item in a custom browser window, exclusive of said non-selected ones of said first plurality of displayed content items;
said browser application being operable to obtain a complete network location of said first content item and custom browser window including said complete network location of said first selected content item;
said browser application being operable to display, in a second browser window, a second source web page having a second plurality of displayed content items;
said browser application being operable for selection of a second selected content item from among said second plurality of displayed content items, said second selected content item being selectable exclusive of non-selected ones of said second plurality of displayed content items, and said second selected content item being identified in response to input from a user through said pointing device;

said second selected content item being file-based and being defined in said second source web page by a relative network location;

said browser application being operable to load said second selected content item in said custom browser window, exclusive of said non-selected ones of said first and second pluralities of displayed content items;

said browser application being operable to obtain a complete network location of said second content item and said custom browser window including said complete network location of said second selected content item;

said browser application being operable to display, in a third browser window, a third source web page having a third plurality of displayed content items, said third plurality of displayed content items including a section of text;

said browser application is operable for selection of a string of text from said section of text, said string of text being selectable exclusive of non-selected ones of said third plurality of displayed content items, and said string of text being identified in response to input from a user through said pointing device; and said browser application being operable to display said string of text in said custom browser window, exclusive of said non-selected ones of said third plurality of displayed content items.

14. A system for creating and displaying a custom selection of content items from web pages, as in claim 13, wherein said browser application is operable to identify said string of text from a click-and-drag operation of said pointing device over said string of text.

15. A system for creating and displaying a custom selection of content items from web pages, as in claim 14, wherein said definition includes said string of text.

16. A system for creating and displaying a custom selection of content items from web pages, comprising:
   a first user computing device having a network browser application and a user input pointing device;
   said browser application being operable to display, in a first browser window, a first source web page having a first plurality of displayed content items;
   said browser application being operable for selection of a first selected content item from among said first plurality of displayed content items, said first selected content item being selectable exclusive of non-selected ones of said first plurality of displayed content items, and said first selected content item being identified in response to input from a user through said pointing device;
   said first selected content item being file-based and being defined in said first source web page by a relative network location;
   said browser application being operable to load said first selected content item in a custom browser window, exclusive of said non-selected ones of said first plurality of displayed content items;
   said browser application being operable to obtain a complete network location of said first content item and custom browser window including said complete network location of said first selected content item;
   said browser application being operable to display, in a second browser window, a second source web page having a second plurality of displayed content items;
   said browser application being operable for selection of a second selected content item from among said second plurality of displayed content items, said second selected content item being selectable exclusive of non-selected ones of said second plurality of displayed content items, and said second selected content item being identified in response to input from a user through said pointing device;
   said second selected content item being file-based and being defined in said second source web page by a relative network location;
   said browser application being operable to load said second selected content item in said custom browser window, exclusive of said non-selected ones of said first and second pluralities of displayed content items;
   said browser application being operable to obtain a complete network location of said second content item and said custom browser window including said complete network location of said second selected content item;
   said browser application is operable to display, in a third browser window, a third source web page having a third plurality of displayed content items;
   said browser application is operable to select a group of selected content items from among said third plurality of content items, said group of selected content items being selectable exclusive of non-selected ones of said third plurality of displayed content items, and said group of selected content items being identified in response to a click-and-drag action of said user through said pointing device;
   one content item of said group of selected content items being file-based and being defined in said third source web page by a relative network location;
   said browser application is operable to load said group of selected content items in a third frame of said custom browser window, exclusive of said non-selected ones of said third plurality of displayed content items; and
   said third frame of said custom browse window including a complete network location of said one content item.

17. A system for creating and displaying a custom selection of content items from web pages, as in claim 16, wherein:
   said first selected content item is loaded in a first frame of said custom browser window, said second selected content item is loaded in a second frame of said custom browser window, and said group of selected content items is loaded in a third fame of said custom browser window;
   said first frame of said custom browser window includes a base reference of said first selected content item, and includes said relative network location of said first selected content item;
   said second frame of said custom browser window includes a base reference of said second selected content item, and includes said relative network address of said second selected content item; and
   said third frame of said custom browser window includes a base reference of said group of selected content items, and includes said relative network address of said one content item of said group of selected content items.

18. A system for creating and displaying a custom selection of content items from web pages, comprising:
   a first user computing device having a network browser application and a user input pointing device;
   said browser application being operable to display, in a first browser window, a first source web page having a first plurality of displayed content items;

said browser application being operable for selection of a first selected content item from among said first plurality of displayed content items, said first selected content item being selectable exclusive of non-selected ones of said first plurality of displayed content items, and said first selected content item being identified in response to input from a user through said pointing device;

said first selected content item being file-based and being defined in said first source web page by a relative network location;

said browser application being operable to load said first selected content item in a custom browser window, exclusive of said non-selected ones of said first plurality of displayed content items;

said browser application being operable to obtain a complete network location of said first content item and custom browser window including said complete network location of said first selected content item;

said browser application being operable to display, in a second browser window, a second source web page having a second plurality of displayed content items;

said browser application being operable for selection of a second selected content item from among said second plurality of displayed content items, said second selected content item being selectable exclusive of non-selected ones of said second plurality of displayed content items, and said second selected content item being identified in response to input from a user through said pointing device;

said second selected content item being file-based and being defined in said second source web page by a relative network location;

said browser application being operable to load said second selected content item in said custom browser window, exclusive of said non-selected ones of said first and second pluralities of displayed content items;

said browser application being operable to obtain a complete network location of said second content item and said custom browser window including said complete network location of said second selected content item;

said definition includes a plurality of keywords associated with said first and second selected content items, said keywords being selected by said browser application from second-level domains and titles of said first and second source web pages; and said custom browser window includes a search icon, which search icon is operable to send a search query to a predetermined internet search engine using said keywords; and said browser application is operable to display, in a third browser window, search results provided by said internet search engine in response to said search query.

19. A system for creating and displaying a custom selection of content items from web pages, as in claim 18, wherein:

said browser application is operable to accept supplemental keywords entered by said user; and said search query includes said supplemental keywords.

* * * * *